US009584682B2

(12) United States Patent
Earnshaw et al.

(10) Patent No.: US 9,584,682 B2
(45) Date of Patent: Feb. 28, 2017

(54) SYSTEM AND METHOD FOR SHARING DATA ACROSS MULTIPLE ELECTRONIC DEVICES

(75) Inventors: Andrew Mark Earnshaw, Kanata (CA); Jianfeng Weng, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 223 days.

(21) Appl. No.: 13/480,424

(22) Filed: May 24, 2012

(65) Prior Publication Data

US 2013/0318159 A1  Nov. 28, 2013

(51) Int. Cl.
*G06F 15/16* (2006.01)
*H04N 1/00* (2006.01)
*H04L 29/08* (2006.01)

(52) U.S. Cl.
CPC ......... *H04N 1/00347* (2013.01); *H04L 67/06* (2013.01); *H04N 1/00307* (2013.01); *H04N 2201/0075* (2013.01); *H04N 2201/0089* (2013.01)

(58) Field of Classification Search
CPC .................................................. H04L 12/1822
USPC .................................................. 709/204, 207
See application file for complete search history.

(56) References Cited

U.S. PATENT DOCUMENTS

| | | | |
|---|---|---|---|
| 7,702,728 B2 | 4/2010 | Zaner et al. | |
| 2002/0056003 A1* | 5/2002 | Goswami | 709/227 |
| 2002/0174010 A1* | 11/2002 | Rice, III | G06F 17/30194 705/14.67 |
| 2004/0133573 A1* | 7/2004 | Miloushev et al. | 707/8 |
| 2006/0053194 A1* | 3/2006 | Schneider | H04L 12/1827 709/204 |
| 2006/0085823 A1 | 4/2006 | Bell et al. | |
| 2007/0050452 A1 | 3/2007 | Raju | |
| 2008/0109852 A1* | 5/2008 | Kretz | G11B 27/002 725/62 |

(Continued)

FOREIGN PATENT DOCUMENTS

| | | |
|---|---|---|
| CA | 2863882 | 8/2013 |
| WO | WO 2011/012332 A1 | 2/2011 |

OTHER PUBLICATIONS

Collomb, M. et al.; "Extending drag-and-drop to new interactive environments: A multi-display, multi- instrument and multi-user approach"; Interacting with Computers; Dec. 1, 2008; pp. 562 to 573; vol. 2, No. 6; Elsevier; ISSN: 0953-5438.

(Continued)

*Primary Examiner* — Wing F Chan
*Assistant Examiner* — Andrew Woo
(74) *Attorney, Agent, or Firm* — Thomas Grzesik; Fleit Gibbons Gutman Bongini & Bianco P.L.

(57) ABSTRACT

Methods, computer readable media, and electronic devices are provided that enable data files to be transferred from a source device to one or more destination devices to share the data files. The method includes initiating a transfer of at least one data file to a destination device after detecting initiation of a file sharing session, the at least one data file being associated with the source device; after transferring at least a portion of the at least one data file, sending a first command to the destination device or receiving a second command from the destination device, the first command or the second command indicating an interaction with the at least one data file; and executing the interaction.

20 Claims, 20 Drawing Sheets

(56) References Cited

U.S. PATENT DOCUMENTS

| | | |
|---|---|---|
| 2010/0023979 A1 | 1/2010 | Patel et al. |
| 2011/0106954 A1 | 5/2011 | Chatterjee et al. |
| 2013/0012310 A1* | 1/2013 | Shepard ............... A63F 13/323 463/29 |
| 2013/0205277 A1* | 8/2013 | Seven ....................... G06F 8/38 717/121 |

OTHER PUBLICATIONS

Veloso Gonzalez, J.; Search Report from corresponding European Application No. 12169368.3; search completed Oct. 19, 2012.
Clawson, J. et al.; "Mobiphos: A Collocated-Synchronous Mobile Photo Sharing Application"; MobileHCI 2008, Sep. 2-5, 2008, Amersterdam; pp. 187 to 195; ACM; ISBN: 978-1-59593-952-4.
Sarvas, R.; "Media Content Metadata and Mobile Picture Sharing"; Proceedings of the 11th Finnish Artificial Intelligence Conference STeP 2004, Sep. 1-3, Vantaa, Finland; Online at http://www.seco.tkk.fi/events/2004/2004-09-02-web-intelligence/papers/sarvas_WebIntelligence2versio.pdf.
Flickr: Introducing Photo Session; http://www.flickr.com/photosession; Accessed online Nov. 11, 2011.
Mobile photo sharing—KoffeePhoto; http://www.koffeephoto.com/en/mobile-photo-sharing/; Accessed online Nov. 11, 2011.
Prezi Viewer for iPad | iPrezi; http://prezi.com/ipad/; Accessed online Nov. 14, 2011.
Google Docs for your Phone; http://www.google.ca/mobile.docs/index.html; Accessed online Nov. 11, 2011.
Canadian Office Action dated Feb. 12, 2015, received for Canadian Application No. 2,815,724.

* cited by examiner

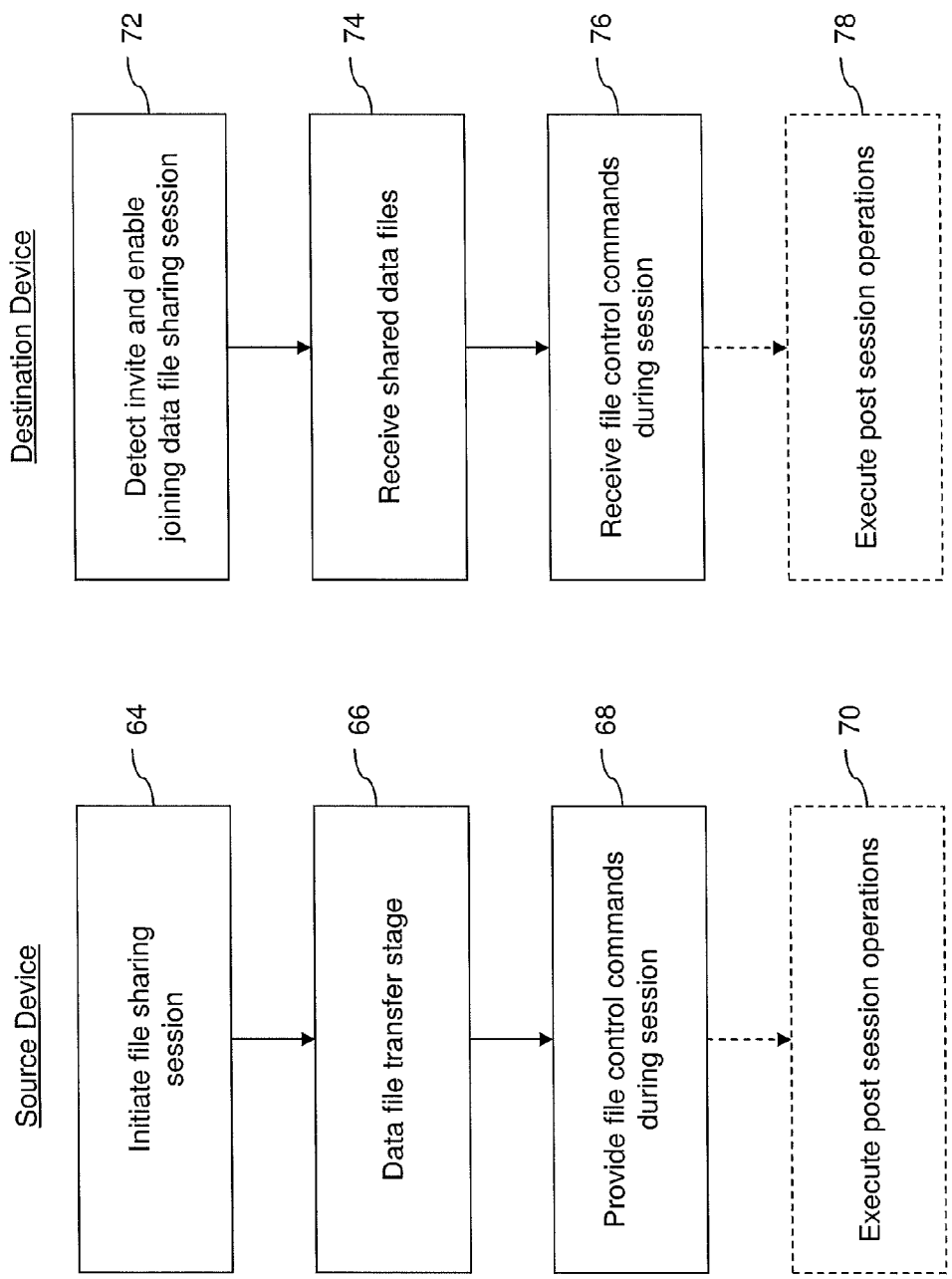

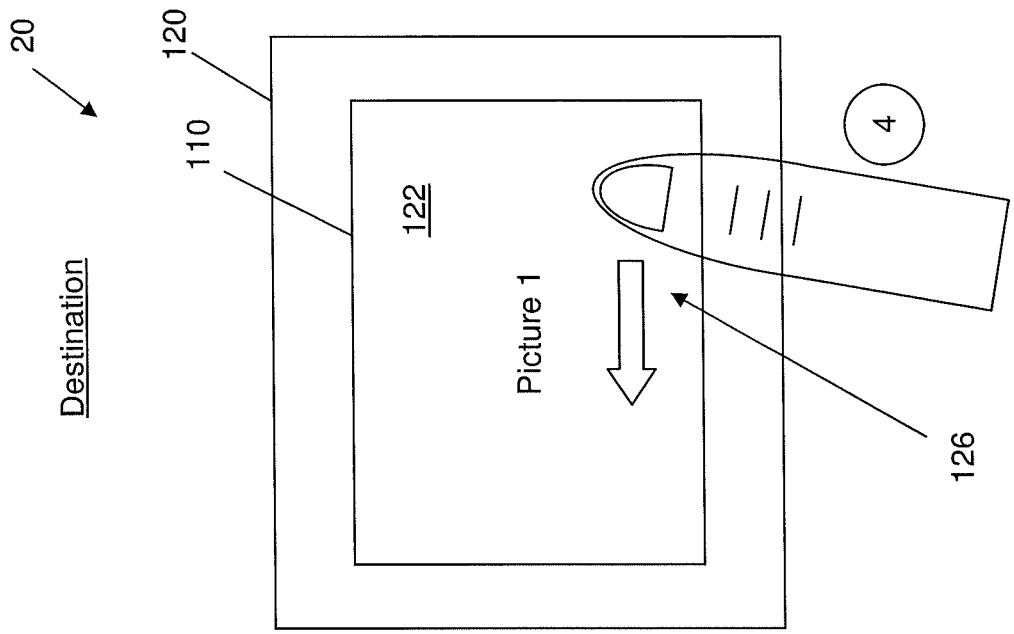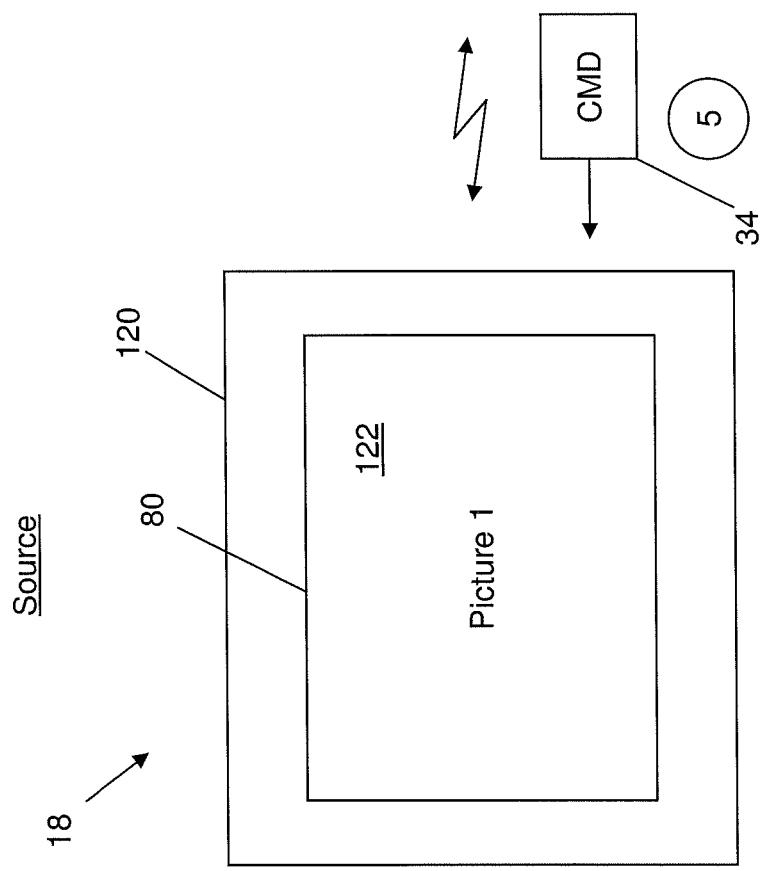
FIG. 16

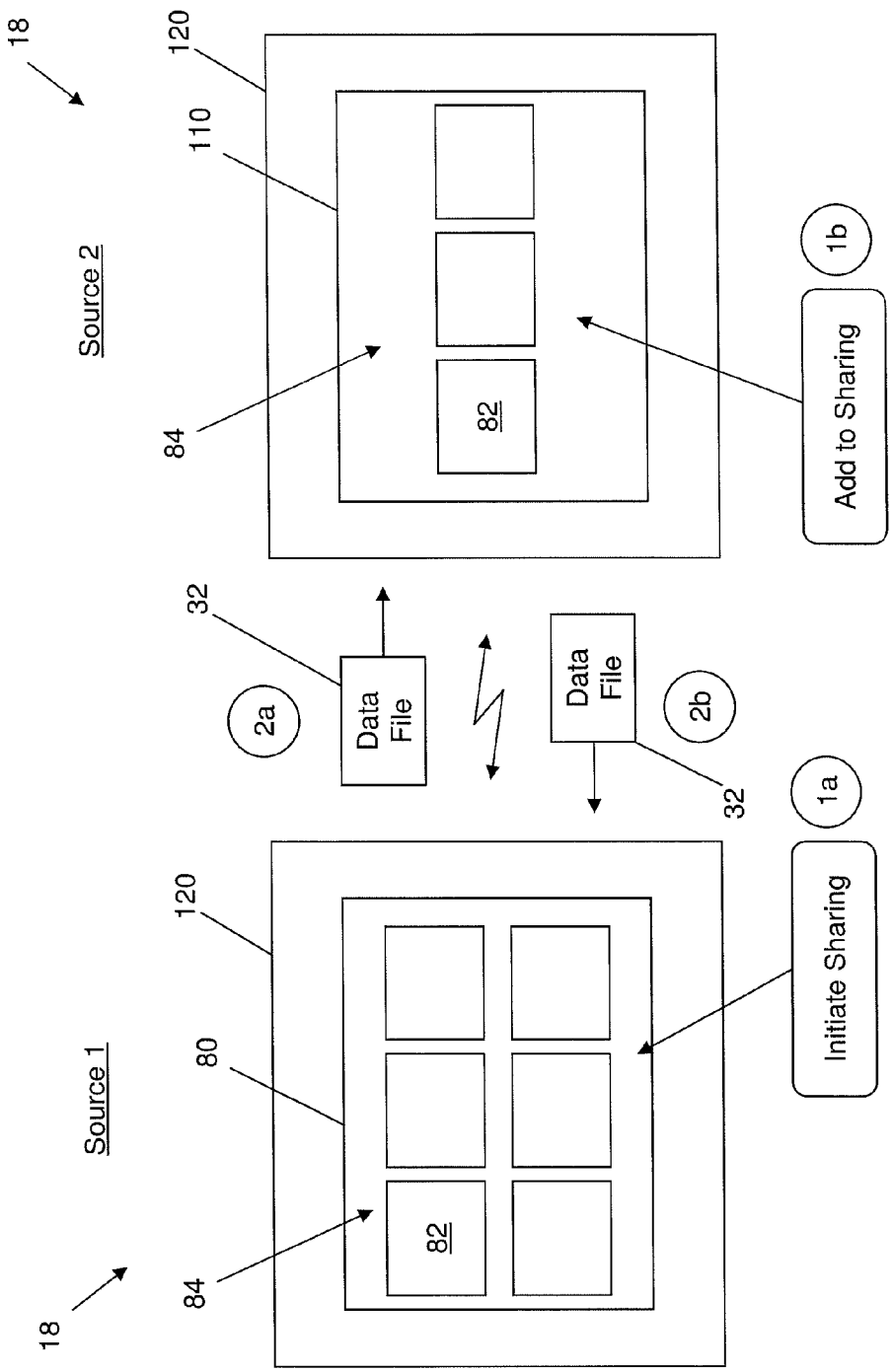

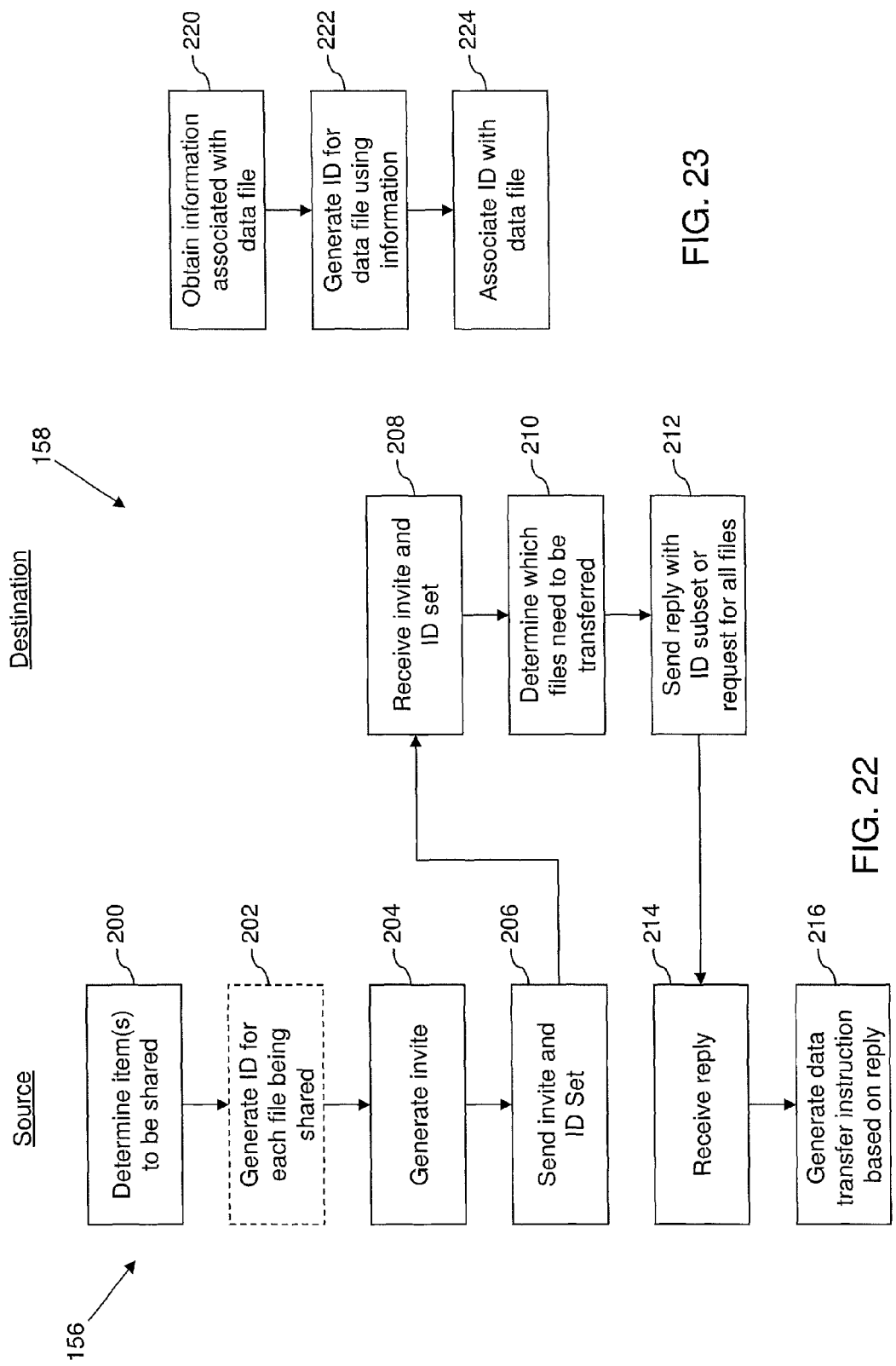

SYSTEM AND METHOD FOR SHARING DATA ACROSS MULTIPLE ELECTRONIC DEVICES

TECHNICAL FIELD

The following relates to systems and methods for sharing data across multiple electronic devices.

DESCRIPTION OF THE RELATED ART

Various types of media are often produced or otherwise exist in a digital format such that a data file is available for consuming the media on, for example, an electronic device. For example, photographs are often captured by a digital camera and the digital camera may be incorporated as a component in another device such as a smart phone or tablet computer.

The ubiquity of electronic devices such as smart phones and tablet computers has made it easier to both acquire and share digital media. For example, a user that captures a set of photographs on a vacation, using their smart phone, may wish to share these photos with friends and family. In addition to electronically transferring the photographs to devices used by those friends and family, the user may also use their smart phone to share the photos, e.g., by showing the photographs to others nearby using a display screen on the smart phone.

However, it can be difficult to share data files such as photographs in this way for groups of more than a few people, particularly where the smart phone has a relatively smaller screen size. As such, when sharing the photographs, it may be difficult for everyone in the group to simultaneously view the photographs, listen to the user explain the photographs, participate in a discussion about the photographs, etc. Similar problems arise when sharing other types of data files such as videos, documents, and multimedia presentations.

BRIEF DESCRIPTION OF THE DRAWINGS

Embodiments will now be described by way of example only with reference to the appended drawings wherein:

FIG. 6 is a flow chart illustrating an example of a set of computer executable operations that may be performed by a source device sharing data files;

FIG. 7 is a flow chart illustrating an example of a set of computer executable operations that may be performed by a destination device participating in a data file sharing session with a source device;

FIGS. 12 to 17 are schematic diagrams illustrating an example of a file sharing session between a source device and a destination device;

FIG. 18 is a schematic diagram illustrating an example of a data file transfer stage between multiple source devices;

FIG. 22 is a flow chart illustrating an example of a set of computer executable operations that may be performed in establishing a file sharing session;

FIG. 23 is a flow chart illustrating an example of a set of computer executable operations that may be performed in generating an identifier to be associated with a data file used in a file sharing session;

DETAILED DESCRIPTION

Figure 1:
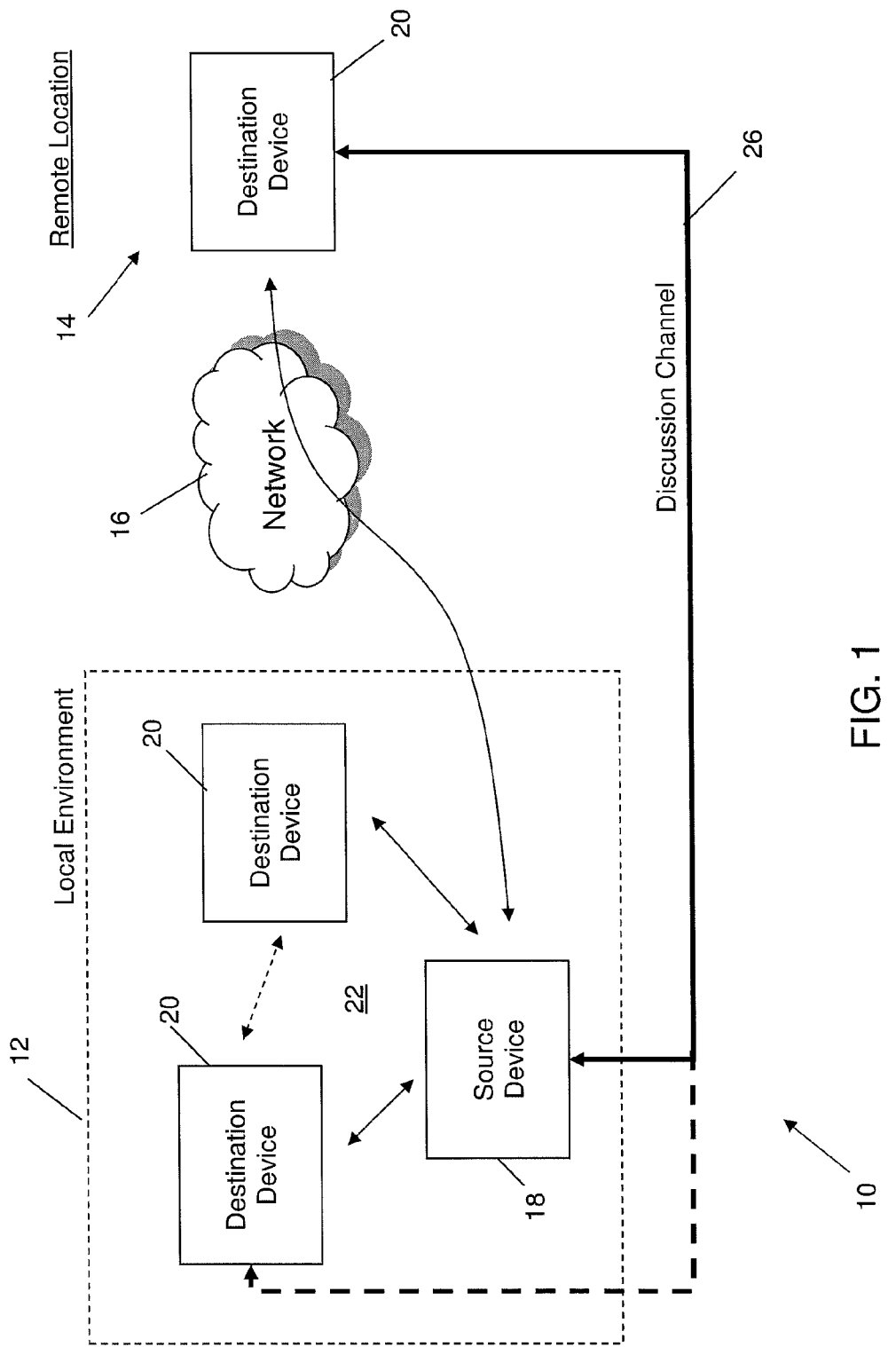
FIG. 1 is a schematic diagram of an example of a communication system including a local environment and a remote location.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

To enhance the sharing of data files such as media items (e.g., photos, videos, documents, presentations, etc.), and address the problems discussed above, a file sharing session may be established using multiple electronic devices that provides the ability to conduct a synchronized presentation of a set of data files.

By initially transferring the set of data files from one or more source devices to one or more destination devices, multiple available display screens can be leveraged to facilitate sharing and interacting with the data files. Also, displaying the data items across multiple screens and interacting with the content in the data files allows for enhanced discussions about the content of the data files. Moreover, the data files may be transferred to destination devices that are both nearby (e.g., in the same physical location) and remote to extend the presentation of data files to a wider audience. Once at least one of the data items has been transferred, presentation and manipulation of the data items can be controlled using commands sent between devices. The use of commands during the file sharing session utilizes less data than attempting to transfer the data in real time during the file sharing session. The transfer of data can be accomplished transparently to the user while providing priority to commands generated during the file sharing session. The content of such commands can also be used to prioritize the data transfer, e.g., if the command references a data item that has not yet been transferred.

Various other communications capabilities of the electronic devices may also be used to support an interactive discussion during the presentation. For example, group chats and telephone or video conferences may be established to allow remote destination devices to participate in a local discussion. Similarly, synchronized presentations of data files can be distributed to encompass groups of devices where each device is remote from each other while still maintaining the ability to hold a discussion among the participants.

Enabling a synchronized presentation of data files across multiple electronic devices according to the principles discussed herein is advantageous when compared to other mechanisms that may be employed to share data. For example, although video-output connections (e.g., a high definition multimedia interface (HDMI)) enable an electronic device to display items on a larger screen such as a television, the device storing the data files would need to be able to produce the video-output signal, the user would need access to the larger screen, and the group of viewers would typically need to be in the same physical location without requiring further equipment (e.g., video conferencing equipment).

Web-based meeting may also be established to enabling sharing on multiple devices. However, web-based meetings are typically geared towards remotely distributed users may not be convenient for users in the same physical location. Also, real time sharing of data items in a web-meeting may experience latency and bandwidth issues, thus degrading the experience.

Data files, such as photographs, may also be attached to a data communication, such as an email, and sent to a target audience. However, this requires an email to be composed, photographs to be found and attached, the email to be sent, and the audience to receive the email and open the attachments. In addition to the multiple steps required, sending a set of data items in this way is asynchronous and would require additional efforts to coordinate an interactive presentation of the data items and/or a discussion of the data items.

To facilitate a synchronized presentation of data items across multiple electronic devices, it has been found that an initial synchronization and transfer of the data items prior to the presentation can be performed whereupon subsequent interactions with each data item can be accomplished using only commands or instructions that can be rapidly communicated to and replicated on each participant device. Moreover, by associating an identifier with each data item being shared enables only data items not previously transferred to the destination device to be transferred for a particular data sharing session. Digital rights management applied to the data items and/or program instructions executed by the data sharing application being used can also control the lifetime of each data item such that only data files permitted to be saved by each destination device may be persistently saved subsequent to the data sharing session.

A data sharing application may also be made available to each of the source and destination devices participating in the file sharing session. The data sharing application may be developed on multiple different platform types, thus enabling a file sharing session to occur across different device types.

Referring now to FIG. 1, an example of a data communication system 10 used for sharing data items is shown. The data communication system 10 in the example shown in FIG. 1 includes a local environment 12 and a remote location 14. The local environment 12 includes a source device 18 and a pair of destination devices 20, and the remote location 14 includes a destination device 20 which is communicable with the source device 18 via a network 16. A source device 18 refers to an electronic device having at least one data item that is contributed by that device to the file sharing session. A destination device 20 refers to an electronic device having at least one data item transferred thereto by a source device 18 for enabling that device to participate in a file sharing session.

The source device 18 and destination devices 20 included in the local environment 12 shown in FIG. 1 are communicable with at least one other device in the local environment 12 over one or more local networks 22. For example, the source device 18 and destination devices 20 may be communicable with each other over a local network accessible via Wi-Fi, may communicate with each other via a short range or near field communication protocol such as Bluetooth, etc. One or more of the source device 18 and destination devices 20 may instead be connected to one of the other devices via a wired connection such as a universal serial bus (USB) cable, Ethernet connection, etc. For example, the source device 18 may be a personal computer wherein one of the destination devices 20 is a smart phone or tablet computer connected directly to the personal computer. As such, some of the destination devices 20 in the local environment 12 may be incapable of communicating directly with each other and instead participate in the file sharing session through the source device 18. For example, a personal computer or television connected directly to the source device 18 may not be capable of communicating directly with a smart phone destination device 20 connectable to the source device 18 via Wi-Fi. It can therefore be appreciated that the file sharing session may be conducted using various network topographies depending on the participating devices and capabilities of such devices.

For destination devices 20 (and source devices 18 if applicable) that are located remotely, a discussion channel 26 may be established with the source device 18 and/or at least one of the destination devices 20. For example, in addition to participating in the synchronized presentation of data items, a destination device 20 in a remote location 14 may be contacted by telephone, instant messaging, or any other suitable communication medium to enable the user of the destination device 20 in the remote location 14 to participate in discussions related to the content of the data items being shared. It can be appreciated that the discussion channel 26 may also be established via the network 16 and is shown as a separate channel in FIG. 1 for ease of illustration.

It can also be appreciated that the composition of the data communication system 10 shown in FIG. 1 is for illustrative purposes only. For example, more than one source device 18 may contribute data items to the file sharing session, more than one (or zero) remote locations 14 may be included, more or fewer destination devices 20 may participate in the file sharing session, etc.

Figure 2:
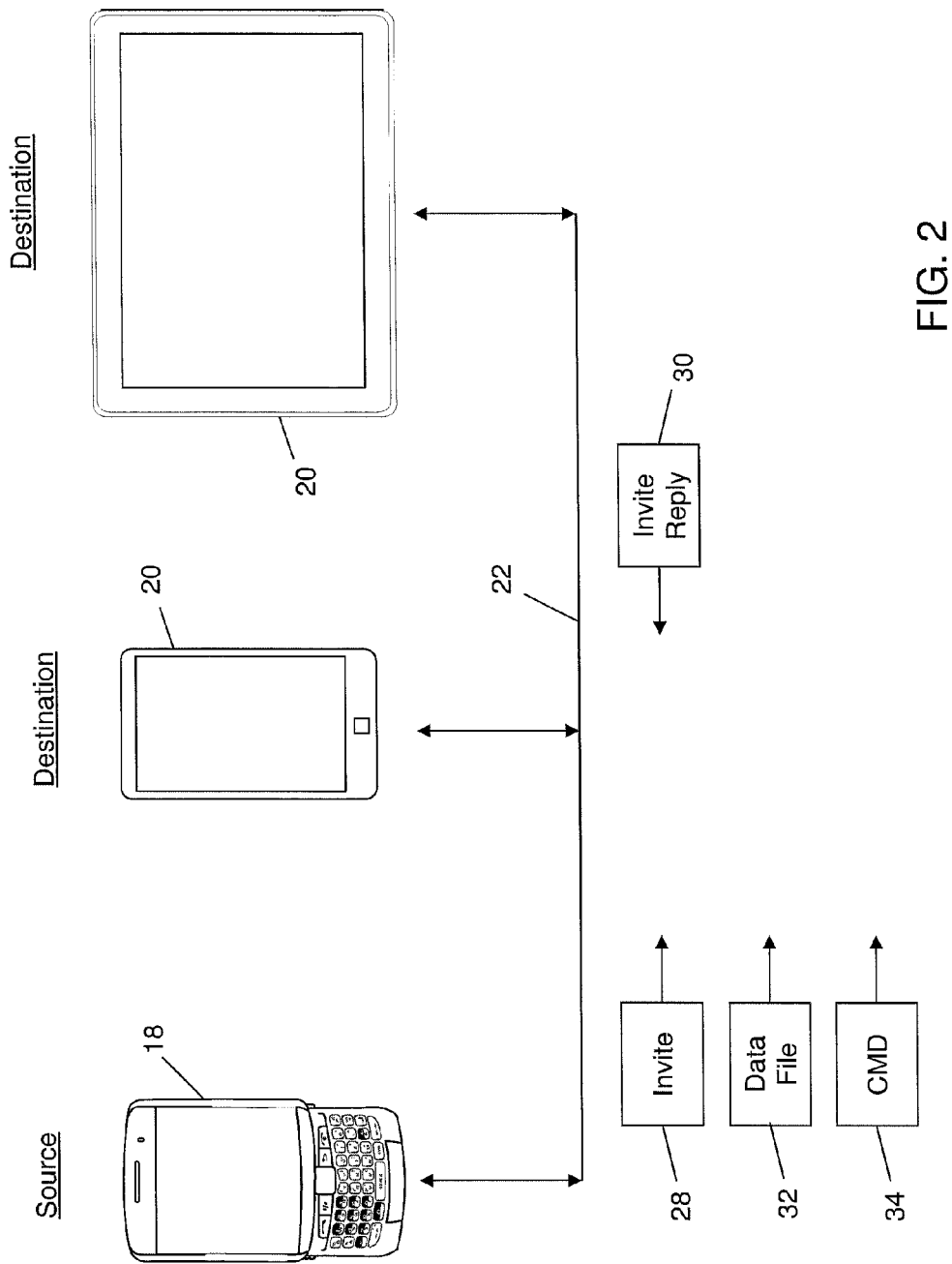
FIG. 2 is a schematic diagram of an example data flow between a source and destination devices.

FIG. 2 illustrates a source device 18 and a pair of destination devices 20 communicable over a local network 22. As illustrated pictorially in FIG. 2, different types of electronic devices may participate in the same data sharing session. By providing a data sharing application 50 (see FIG. 5) as will be discussed below, data items may be shared across multiple device platform types. The source device 18 in this example sends an invite 28 to the destination devices 20. The destination devices 20 may return an invite reply 30 in order to participate in the file sharing session initiated using the invite 28. One or more destination devices 20 invited to join the file sharing session may be non-responsive and thus the source 28 may proceed with establishing the file sharing session without waiting for replies from each destination device 20. The source device 18 sends data files 32 that are to be included in the file sharing presentation and that are not already stored on the destination devices 20. It can be appreciated that each destination device 20 may already have all data files 32 to be included in the file sharing session and thus a transfer of data files 32 may not be required for every session. For example, the same set of electronic devices may participate in multiple sessions involving the same set of data files 32 and assuming all data files 32 remain cached at each destination device 20, the file sharing session may immediately begin.

Once at least the first data file 32 to be shared is present on each destination device 20, the source device 18 in this example may send commands (CMD) 34 to the destination devices 20 for conducting a presentation of the shared data files 32. The commands 34 may include presentation control commands (e.g., next item, display item "X", fast forward, next presentation, etc.), data manipulation commands (e.g., zoom, scroll, text entry, etc.), session control commands (e.g., start session, end session, pause session, resume session, etc.), among other types of commands.

The commands 34 may be used to enable various inputs on one device to be replicated on the other device(s), but may take into consideration the number of commands 34 that would be required to replicate the input. For example, moving a cursor on the source device 18 and replicating the same movements on the destination devices 20 in real-time would likely require a steady stream of commands 34 to continually update the movements. To avoid overwhelming the resources of the source and destination devices 18, 20, input methods may be provided that provide a balance between the ability to interact with content, and the resources required to replicate the inputs on other devices. For example, the user may be provided with an option to display a temporary cursor at a specific position (e.g., use a "press-and-hold" input on a touch screen or other input when a cursor is placed at a steady location) in order to refer to a particular portion of the content in the data item being displayed. A command 34 may be used to indicate a position at which a cursor or other visual element or effect is to be replicated on other devices, and may disappear when the user initiating the input releases or otherwise finishes the input.

In the example shown in FIG. 2, the source device 18 sends the commands 34 to the destination devices 20. The source device 18 may be designated as a control device or "master" device while the destination devices are controlled devices or "slave" devices. Alternatively, a "masterless" configuration may be used wherein commands 34 may be generated by both source devices 18 and destination devices 20. The types of commands available to each device type may also be controllable. For example, session commands may be restricted to source devices 18 whereas data manipulation commands may be available to both source devices 18 and destination devices 20.

It can be appreciated that multiple ones of the electronic devices participating in the file sharing session may be operated by or otherwise associated with a common user, for example, a smart phone and tablet computer. In such scenarios, data sharing may be established between devices associated with a common user without using an invitation mechanism, e.g., if specified by the user on the source device 18. Also, since multiple devices associated with the same user may be more likely to be connected with each other at other times (which may also include sharing data items that are subsequently included in the file sharing session), a synchronization of data items or accounting of what each device has may be performed periodically outside of a file sharing session, to minimize the operations required between related devices when being used in the same file sharing session.

Figure 3:
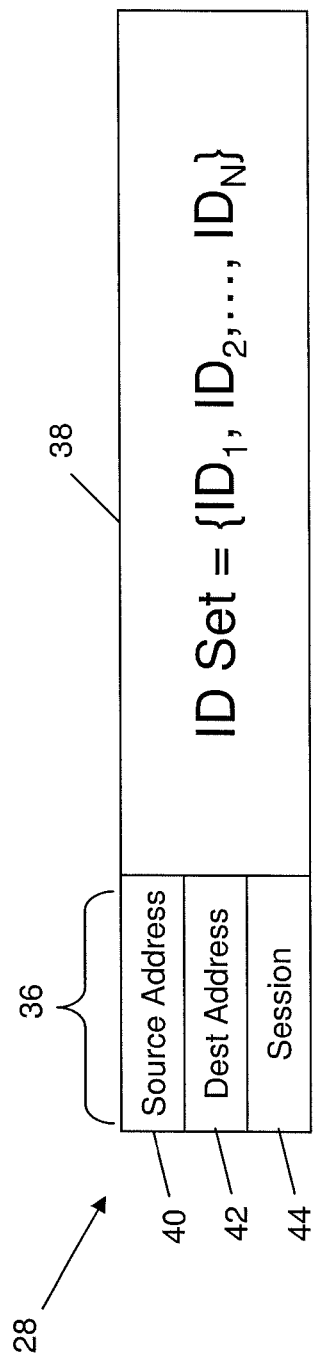
FIG. 3 is a schematic diagram of an example of a file sharing invite message.

FIG. 3 illustrates an example of an invite 28. The invite 28 includes a header 36 and a payload 38. The header 36 includes a source address 40 indicating a communication address for the source device 18 (e.g., IP address, personal identification number (PIN), telephone number, etc.), a destination address 42 indicating a communication address for at least one destination device 20, and a session indicator 44 (session). The payload 38 in this example includes an identifier (ID) Set, which lists the data files 32 to be included in the file sharing session (e.g, $ID_1, ID_2, \ldots, ID_N$ as shown). The ID Set is provided to enable a synchronization of data items among the source device 18 and destination devices 20 in order to avoid transferring copies of data files 32 that are already stored or cached by particular ones of the destination devices 20. It can be appreciated that the data structure shown in FIG. 3 is provided for illustrative purposes only and the invite 28 may utilize a different data structure to suit the communication medium being used to deliver the invite 28.

Figure 4:
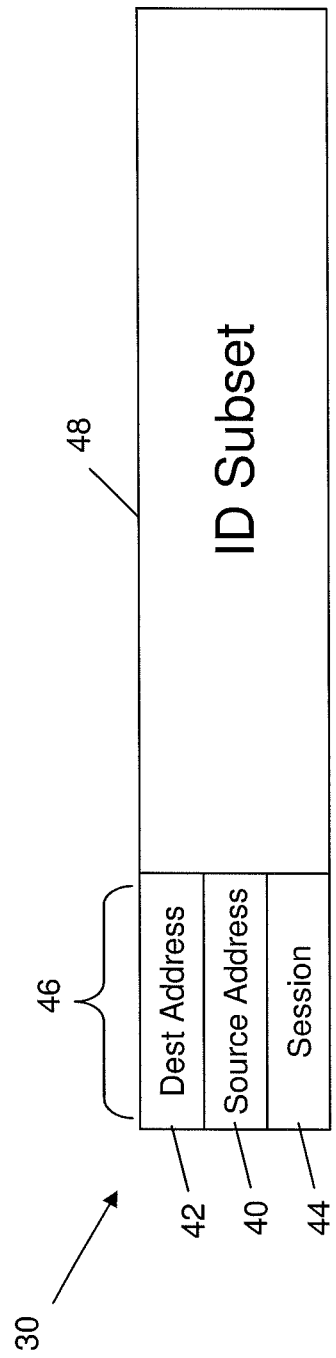
FIG. 4 is a schematic diagram of an example of an invite response message.

FIG. 4 illustrates an example of an invite reply 30. The invite reply 30 includes a header 46 and a payload 48. The header 46 includes the destination address 42 indicating the destination device 20 that is responding to the invite 28 associated with the session 44, the source address 40 indicating a communication address for the source device 18, and the session indicator 44 related to the invite 28 being responded to. The payload 48 in this example includes an ID Subset, which lists the data files 32 that the destination device 42 providing the invite reply 30 needs to have of the entire ID Set included in the invite 28. It can be appreciated that the ID Subset may include all of the IDs listed in the ID Set, may include a null entry or otherwise indicate that the destination device 20 already has all of the data files 32 associated with the ID Set, or any subset of the IDs in the ID Set. It can also be appreciated that the data structure shown in FIG. 4 is provided for illustrative purposes only and the invite reply 30 may utilize a different data structure to suit the communication medium being used to deliver the invite reply 30, which may or may not be the same data structure as the invite 28.

Figure 5:
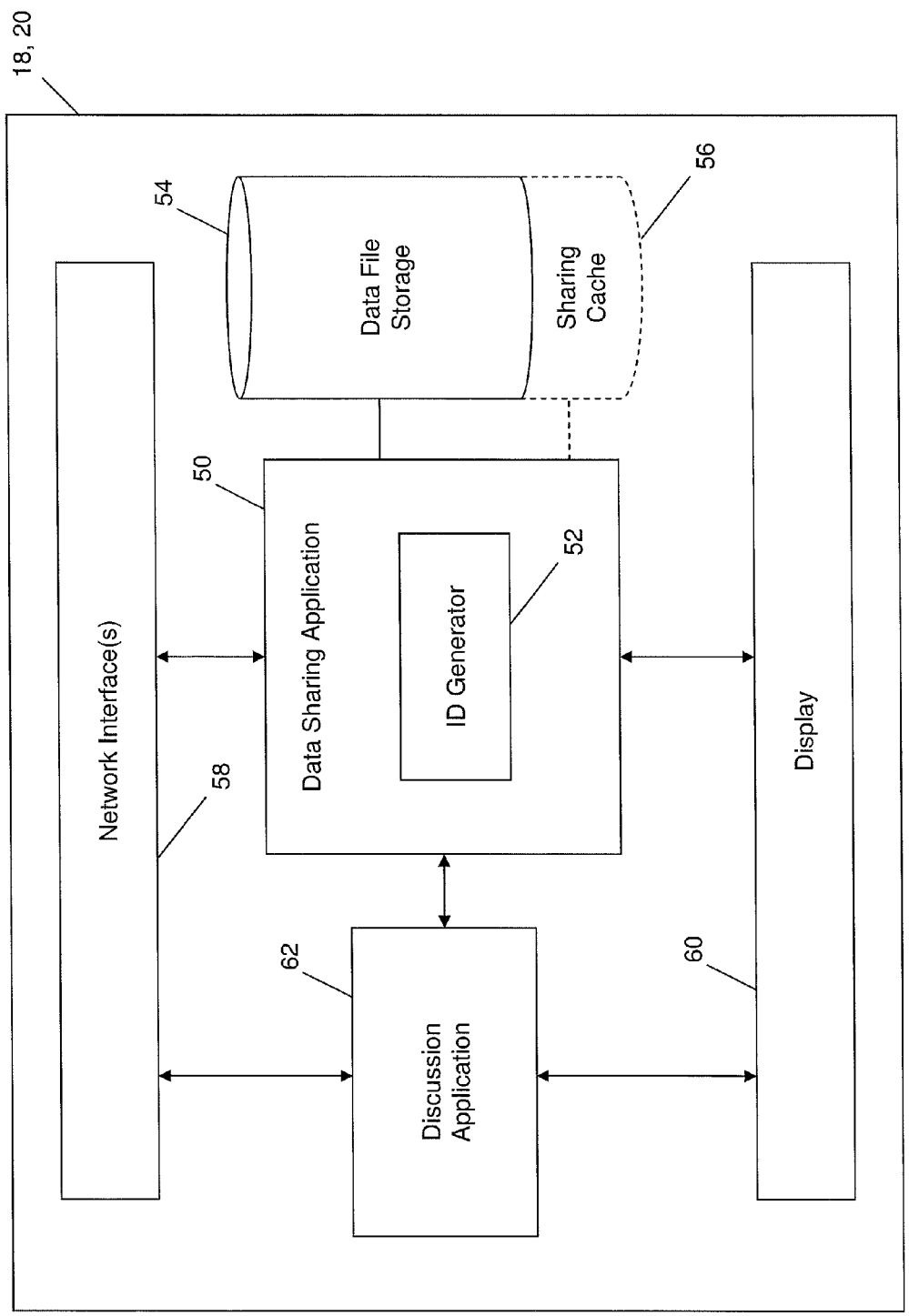
FIG. 5 is a block diagram of an example of a configuration for a source or destination device.

FIG. 5 illustrates a configuration that may be applicable to either or both source devices 18 and destination devices 20. A data sharing application 50 is provided for initiating and/or participating in a file sharing session, and may be used to enable a particular electronic device to act as either a source device 18 or destination device 20 depending on whether that electronic device initiates the file sharing session. The data sharing application 50 includes an ID generator 52 which is operable to generate an ID for a data file 32 and associate the generated ID with that data file 32 for subsequent identification (e.g., by including same in an ID Set). It can be appreciated that the data sharing application 50 is shown separately in FIG. 5 for illustrative purposes and may also be included as a component or set of functionalities provided by another application (not shown). For example, a media player may include a file sharing option that provides the functionality of the data sharing application 50 according to the principles herein described.

The data sharing application 50 includes or otherwise has access to a data file storage 54, which may be any memory or storage component that includes at least one data file 32 that can be accessed in order to include that data file 32 in a data sharing session. For example, a media card or device memory may be accessed by the data sharing application 50 in order to obtain copies of photos, videos, documents, audio files, or any other data file 32 being shared.

The data sharing application 50 may also include or otherwise have access to a sharing cache 56. The sharing cache 56 may be used to store data files 32 that have been shared in a file sharing session and may comprise a separate memory or data storage element or be included in the data file storage 54. The sharing cache 56 may be used to temporarily store data files 32 used in a file sharing session in order to enable post session operations such as deletion of data files 32 or persistent storage of the data files 32 as explained in greater detail below. It can be appreciated that the sharing cache 56 is shown for illustrative purposes only and the data sharing application 50 may also store pointers or other memory location information indicating where data files 32 originating from source devices 18 are stored, for example, in the data file storage 54, which may be accessible to other applications (not shown). The data file storage 54 may also reside outside of the electronic device, e.g., in a cloud environment or other location in a network.

One or more network interfaces 58 are provided to enable the source devices 18 and destination devices 20 to communicate with each other using available network access technologies. For example, a network interface 58 may be provided for connecting to a cellular network, a network interface 58 may be provided to connect to a Wi-Fi network, a network interface 58 may be provided to connect to another device directly via Bluetooth, other near field communication protocols, a USB cable, etc. A display 60 is also shown in FIG. 5, which enables the data sharing application 50 to display user interfaces on a display screen of the source device 18 or destination device 20.

The source devices 18 and destination devices 20 may also include a discussion application 62 as shown in FIG. 5 to enable remotely located users to participate in discussions with other users participating in the file sharing session, via their respective electronic devices. The discussion application 62 may include messaging capabilities, telephony capabilities, or any other suitable communication medium or media.

FIG. 6 illustrates a set of stages that may be involved in a file sharing session from the perspective of the source device 18 that initiates the session. At 64, the source device 18 initiates the file sharing session, e.g., using the data sharing application 50. For example, the data sharing application 50 may be invoked and an option selected for sharing a number of data files 32. The source device 18 then participates in a data file transfer stage, at 66, which provides copies of data files 32 to at least one destination device 20, or information enabling the destination device 20 to independently obtain the data file 32. For example, the source device 18 may send a link such as a URL to enable the destination device 20 to download the data file(s) 32 from another source such as a file sharing website. Completion of the file transfer stage enables the session to commence and the source device 20 in this example may provide control commands 34 during the session, at 68.

After the session ends, the source device 18 may also execute one or more post session operations, at 70, such as sending an instruction to the destination devices 20 to delete the data files 32 transferred for the session, prompting the user associated with the source device 18 to allow or deny saving the data files 32, etc. It can be appreciated that the source device 18 may not need to perform any post session operations. For example, the source device 18 may be operable to always allow destination devices 20 to store the data files 32, permissions may be established prior to or during the session, or the post session operations may only be required on the destination devices 20.

FIG. 7 illustrates the file sharing stages from the perspective of the destination device 20. The destination device 20 in this example detects receipt of an invite 28 to join a file sharing session, at 72, and enables the destination device 20 to join the session, e.g., by prompting the user, automatically determining the ID Subset, etc. The destination device 20, after replying to the invite 28 begins receiving shared data files 32, at 74 (e.g., from the source device 18 or by downloading from another location). The destination device 20 may also receive and process control commands 34 during the session, at 76. It can be appreciated that the destination device 20 may also be operable to generate and send its own control commands 34 during the session.

After the session ends, the destination device 20 may also execute one or more post session operations, at 78, such as automatically deleting the data files 32 shared by the source device 18, prompting the user to save those data files 32 permitted to be saved, etc. It can be appreciated that the destination device 20 may not need to perform any post session operations. For example, the destination device 20 may be operable to automatically apply predetermined rules for storing or not storing data files 32, and such permissions may be established prior to or during the session.

Figures 8, 9:
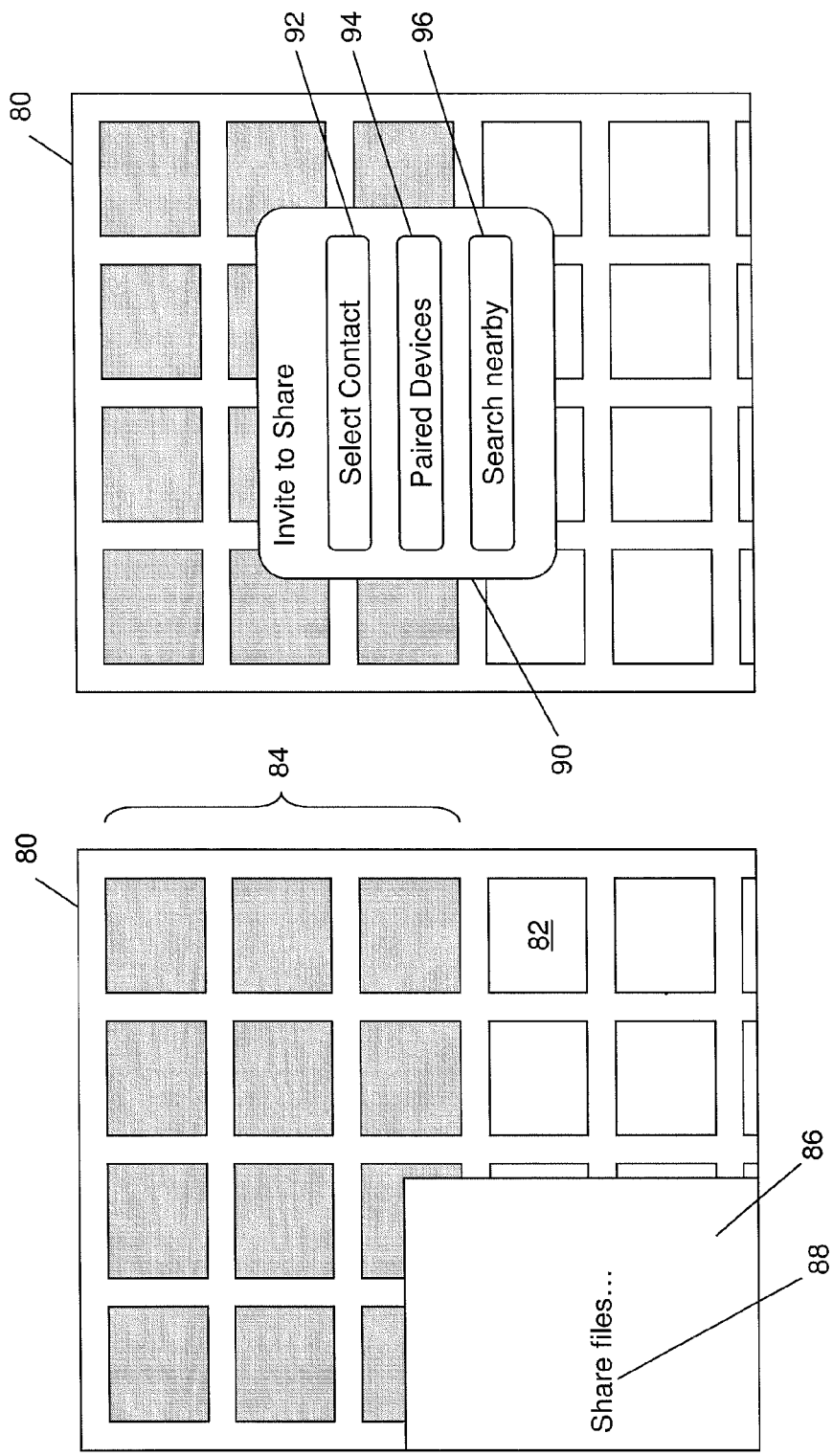
FIG. 8 is a screen shot of an example of a user interface displaying a collection of data files that may be shared using a menu option.
FIG. 9 is a screen shot illustrating a tool for generating a file sharing invitation.

FIG. 8 illustrates a screen shot of a user interface 80 displaying a series of items 82 having associated data files 32. In the example shown in FIG. 8, a set 84 of the items 82 is selected or highlighted and a menu of options 86 is invoked and displayed within the user interface 80. The menu of options 86 includes a "share files" option 88 which, when selected initiates a sharing session using the highlighted set 84. It can be appreciated from FIG. 8 that the data sharing application 50 may be embodied as, or initiated from within, a menu or other input mechanism within another application. For example, the user interface 80 shown in FIG. 8 may correspond to a folder of items 82 stored on the source device 18.

FIG. 9 illustrates a screen shot of the user interface 80 displaying an invitation destination device selector 90 that may be displayed after detecting selection of the share files option 88 in the menu of options 86. The device selector 90 in this example includes a select contact button 92 which may be selected to choose destination devices 20 from a list of contacts on the source device 18; a paired devices button 94 which may be selected to choose from destination devices 20 that have previously been paired with the source device 18, e.g., via Bluetooth; and a search nearby button 96 which may be selected to search the local environment 14 for destination devices 20 that are capable of pairing with the source device 18 for the file transfer session.

Figure 11:
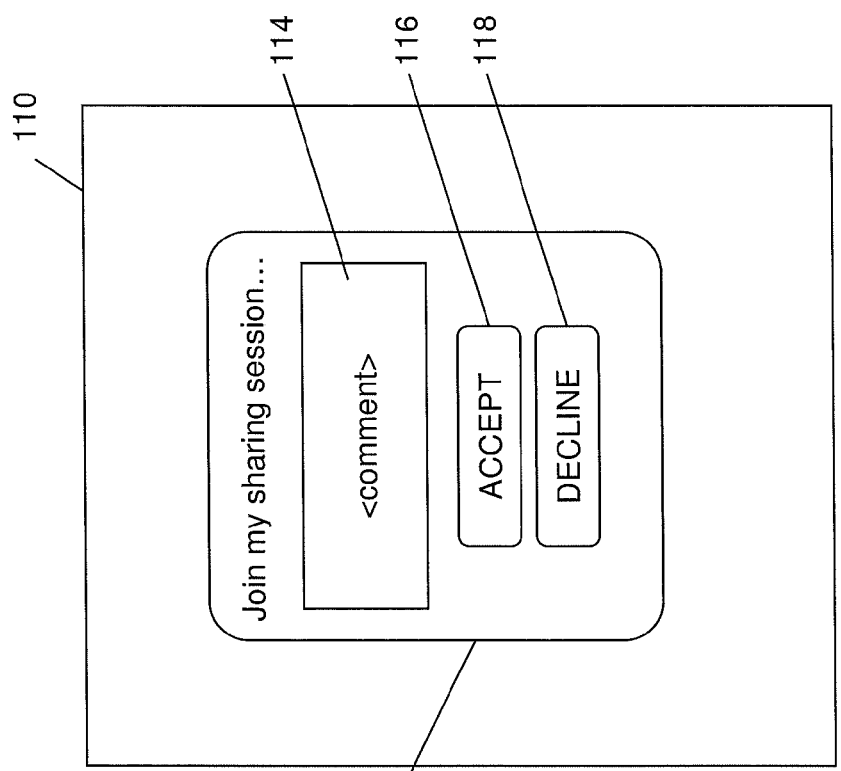
FIG. 11 is a screen shot illustrating a received file sharing invitation.
Figure 10:
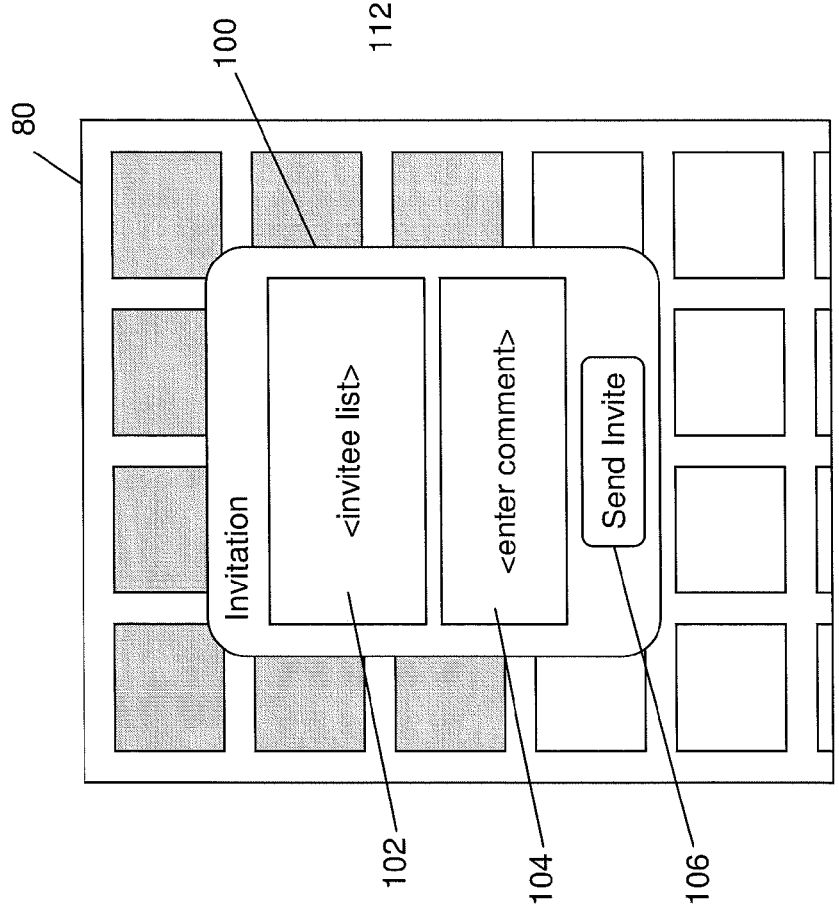
FIG. 10 is a screen shot illustrating a file sharing invitation to be sent.

FIG. 10 illustrates a screen shot of the user interface 80 displaying an invitation creator 100. The invitation creator 100 may be displayed after the user has selected one or more invitees, or may be used to launch the device selector 90 shown in FIG. 9. The invitation creator 100 includes an invitee list portion, an invitation comment portion 104 to enable a message to be added to the invite 28, and a send invite button 106 which may be selected to send the invite 28 to the list of invitees. FIG. 11 illustrates a screen shot of a user interface 110 displayed by a destination device 20 after receiving an invite 28. Within or superimposed on the user interface 110 is a received invitation 112. The received invitation 112 includes a comment portion 114 which may include a comment added by the source device 18, or a default comment or message if one is not added by the source device 18. The received invitation 112 also includes an accept button 116 to enable the destination device 20 to accept the invitation, and a decline button 118 to enable the destination device 20 to decline the invitation and thus not participate in the file sharing session.

It can be appreciated that the invites 28 could also be sent by one source device 18 to another source device 18 (e.g., when more than one electronic device contributes content to the file sharing session), or could be sent by a destination device 20. For example, a destination device 20 may initiate a file sharing session based on data files 32 that are stored on another device, which would be considered a source device 18. For ease of illustration, the following examples assume that an invite 28 originates from the source device 18, i.e., assumes that the device which will be sharing the data files 32 is the one that has the data files 32.

FIGS. 12 through 17 illustrate examples of file sharing sessions between a source device 18 and a destination device 20.

Figure 12:
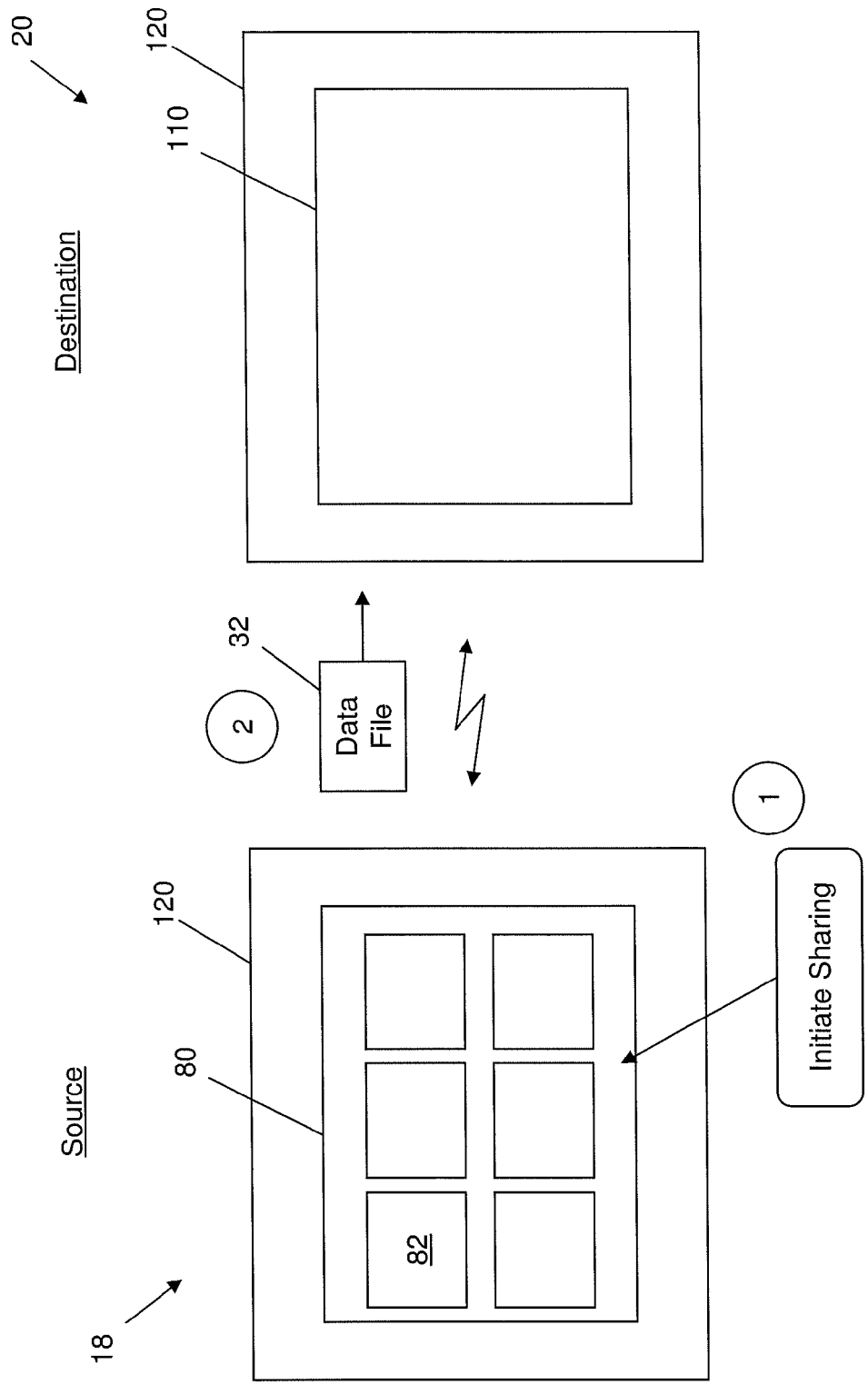

Referring first to FIG. 12, a screen shot of the user interface 80 on a display screen 120 of the source device 18 includes a number of data items 82. By initiating a file sharing session, at stage 1, at least one data file 32 associated with the data items 82 may be transferred to destination device 20, at stage 2. By initiating the transfer of the data file(s) 32 prior to the file sharing session beginning, once at least one of the data files 32 has been transferred, session commands 34 (e.g., see FIG. 13) may begin to be used to provide a synchronized presentation of the data files 32 (and manipulation thereof if applicable) across the source device 18 and the destination device 20.

The initial synchronization of the destination device(s) 20 and the source device(s) 18 allows each device participating in the file sharing session to have a local copy of the data file(s) 32. Since the initial transfer of data file(s) 32, at stage 2, may require a noticeable time lag depending on the size and number of data files 32 being transferred, various mechanisms may be employed to accommodate this stage. For example, the time lag may only be noticeable for the first data file 32 being transferred wherein the file sharing session may begin after a successful transfer of the first data file 32 while the remaining data files 32 (if any) continue to be transferred while the session proceeds.

A distraction or other delay mechanism may also be employed. For example, the data sharing application 50 may prompt each user to enter information while the initial transfer is being completed to ensure that at least some data is transferred without the user noticing a time lag. A chat session or telephone conference may also be established at the beginning of the session in order to delay commencement of the file sharing presentation while operations are performed to establish the chat session or telephone conference. It can be appreciated that even the time taken to prompt the user to indicate that these options are available may be enough to allow for at least one data file 32 to be transferred before the file sharing session begins.

By having the initial transfer of data files 32 performed or at least initiated at the beginning of the file sharing session, rather than transfer the data files 32 in real-time, a seamless presentation can be effected across all devices, since only control or manipulation commands 34 are required thereafter. A screen shot of the user interface 110 of the display screen 120 of the destination device 20 illustrates that the data items 82 are not yet available on the destination device 20.

Figure 13:
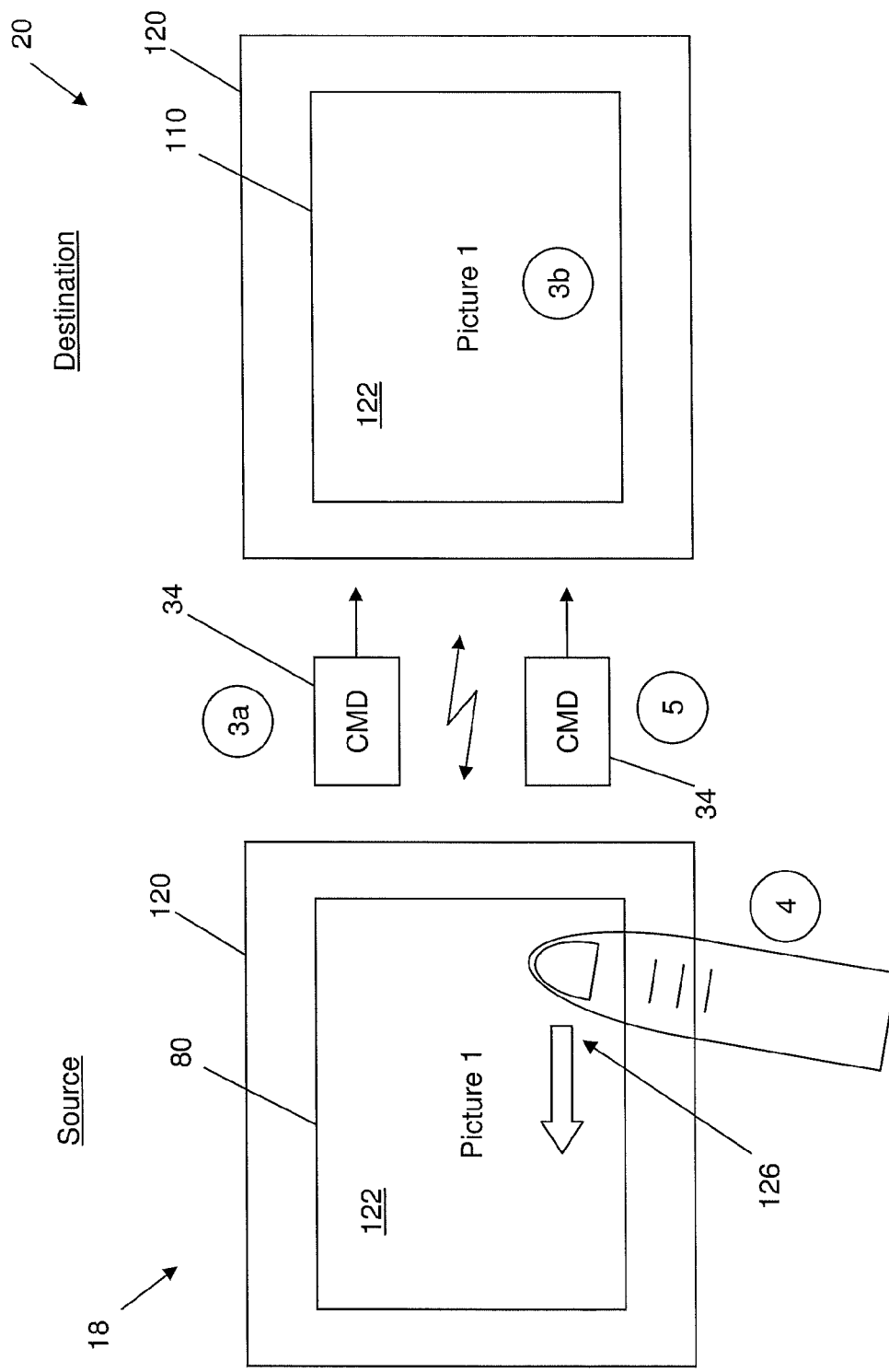
Figure 14:
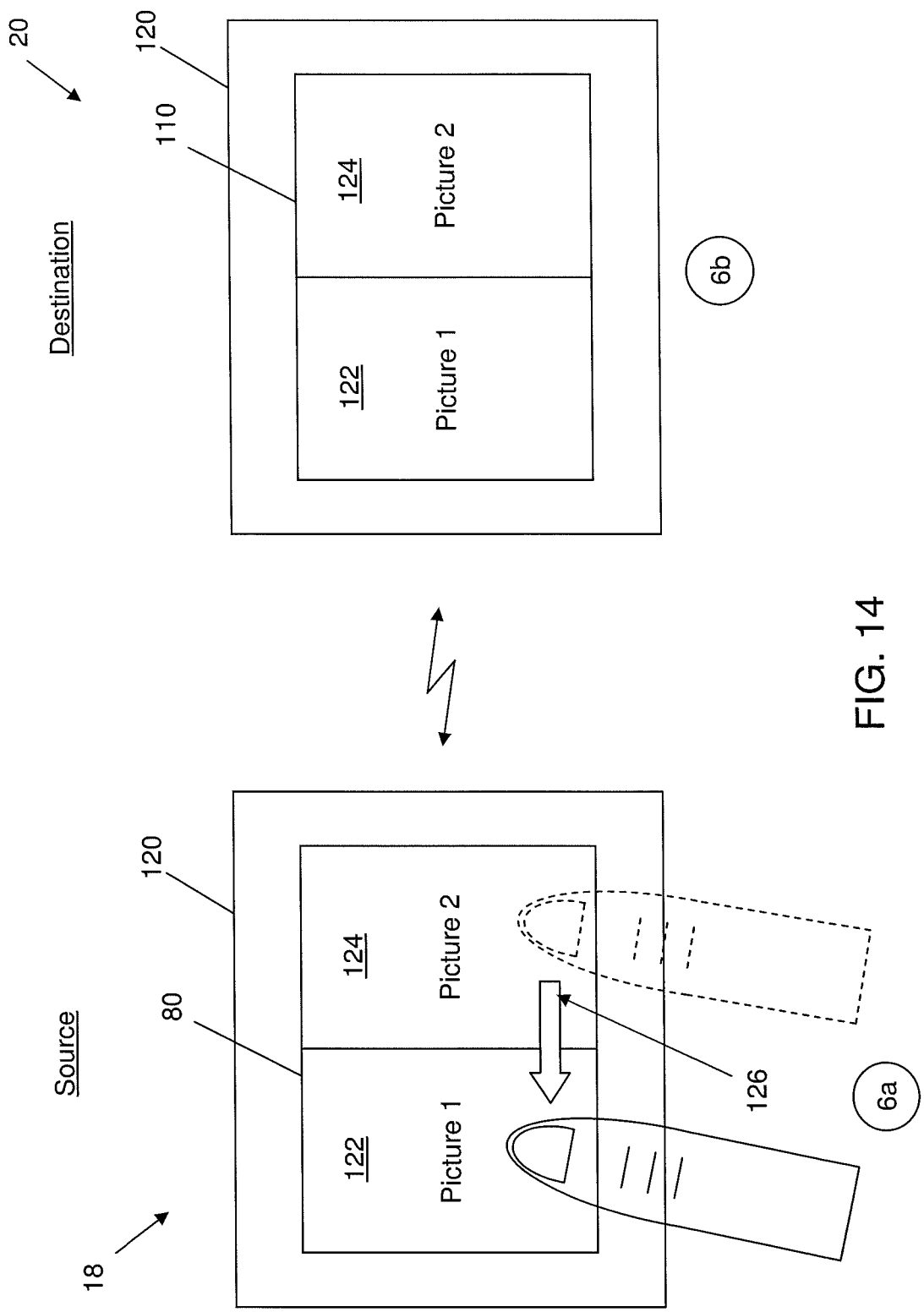

After completion of the data transfer, at stage 2, the source device 18 generates and sends a command 34, at stage 3a, to have a first data item 122 (Picture 1) displayed on the destination device 20 at the same time that the first data item 122 (Picture 1) is displayed on the source device 18, as shown in FIG. 13. In this way, the file sharing session may begin by loading the first data item 122 to be displayed in a presentation of the data files 32 transferred in stage 2. FIG. 13 also illustrates a further command 34 generated by the source device 18 in detecting a swipe gesture 126, at stage 4, that corresponds to an advancement to the next data item 124 (see also FIG. 14). Detection of the swipe gesture 126 at stage 4 generates a command that is sent to the destination device 20, at stage 5, to have the destination device 20 advance to the next data item 124 at the same time as the source device 18 as shown in FIG. 14. It can be appreciated that if the data file 32 associated with Picture 2 is queued for transfer or otherwise has not yet been transferred to the destination device 20, the command 34 in stage 5 may be used to re-prioritize the data file transfer sequence if necessary to prioritize a transfer of the data file 32 for Picture 2.

FIG. 14 illustrates further execution of the swipe gesture 126 on the source device 18, which causes the respective screen shots 80, 110 of the source and destination devices 18, to display a transition between the first data item 122 and the second data item 124 on both devices 18, 20, in stages 6a and 6b. It can be appreciated that the swipe gesture 126 may include an expected amount of time to complete the transition or may require multiple commands 34 to be sent in order to closely mimic the gesture, e.g., when the user performs a gradual swipe versus a rapid swipe, etc.

Figure 15:
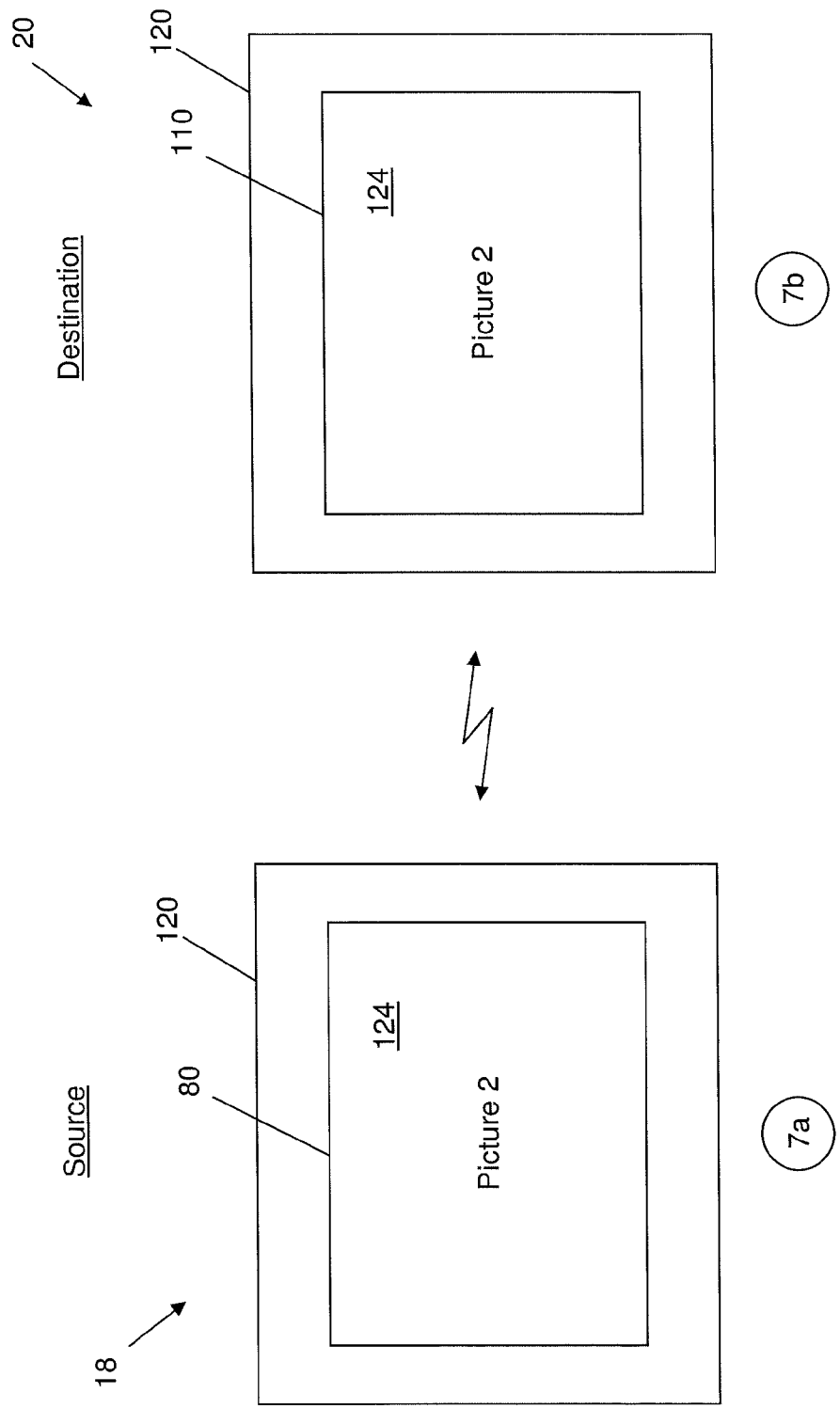

FIG. 15 illustrates the result of the swipe gesture 126 whereupon the second data item 124 is displayed concurrently by the source device 18 and the destination device 20.

Figure 17:
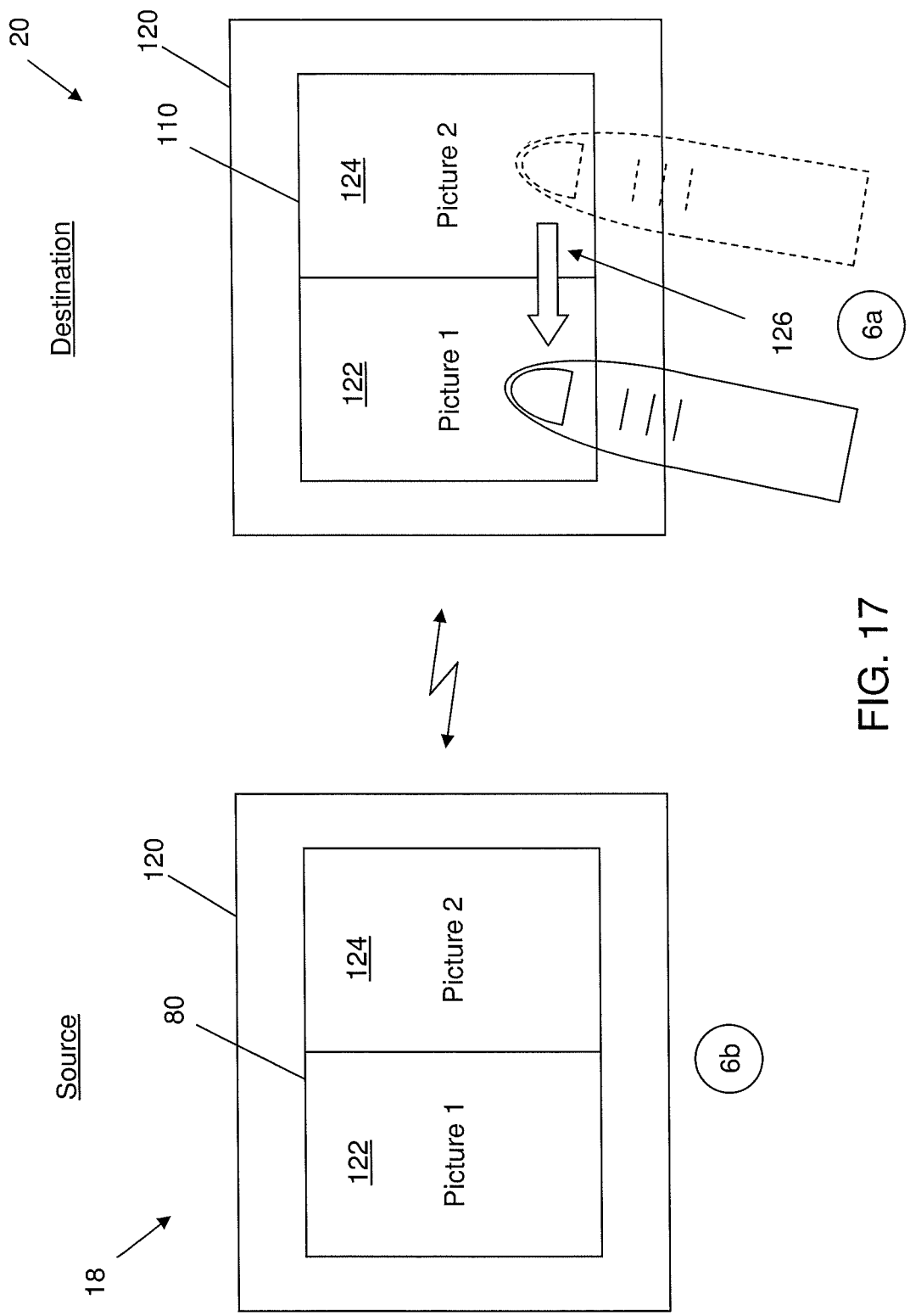

The example shown in FIGS. 12 to 15 may apply to both master/slave relationships between the source device 18 and the destination device 20 and examples wherein no master exists and the destination device 20 may also generate commands 34 during a file sharing session. FIG. 16 illustrates an example wherein a master/slave relationship does not exist and commands 34 may be generated by the destination device 20. In the example shown in FIG. 16, the same swipe gesture 126 shown in FIGS. 13 and 14 is detected by the destination device 20. Assuming that the destination device 20 has permission to impart at least some control over the file sharing session, stages 4, 5, and 6a from the example of FIGS. 12 to 15 are instead performed by the destination device 20 and stage 6b is performed on the source device 18 as shown in FIGS. 16 and 17, since the destination device 20 in this example controls an operation that would be reflected on the source device 18.

Although the example of a swipe gesture has been used here to advance from one picture to another, this is not meant to be limiting and other user actions may be used to switch from one picture to another. For example, a user could press a button or key, swipe a track-pad, tap on the device's touch-screen, etc. In addition, a preconfigured timer (e.g. located on the source device 18) could cause all devices to advance to the next picture after a predetermined period of time. This automatic timer-based advancement could be suspended upon user action (e.g., a user presses a button or touches the screen).

FIG. 18 illustrates an example wherein a pair of source devices 18 (Source 1 and Source 2) participate in a file sharing session. In the example shown in FIG. 18, Source 1 initiates the sharing session, at stage 1*a*, and Source 2 enables additional data items 82 to be shared by Source 2. It can be appreciated that stages 1*a* and 1*b* may be implemented in various ways, including providing an option in association with the received invite to add additional data files 32 to the presentation and thus convert a destination device 20 to a source device 18. At stage 2*a*, Source 1 transfers at least one data file 32 to Source 2 and at stage 2*b*, Source 2 transfers at least one data file 32 to Source 1.

At the end of a file sharing session, data files 32 that have been transferred from source devices 18 to destination devices 20 can have permissions associated with them that allow the source of the data files 32 to specify whether or not particular ones (or any) of the data files 32 may be persistently stored by the destination devices 20, e.g., transferred from the sharing cache 54 to the data file storage 52 on the destination device 20. Such permissions may be predetermined, or may be controllable on a session by session basis. The permissions can also be applied individually to each destination device 20 such that one particular destination device 20 may be allowed to save the data files 32 while others are not. Similarly, the permissions may be applied individually on a file-by-file basis to enable some data files 32 to be stored by destination devices 20 while others cannot.

Figure 20:
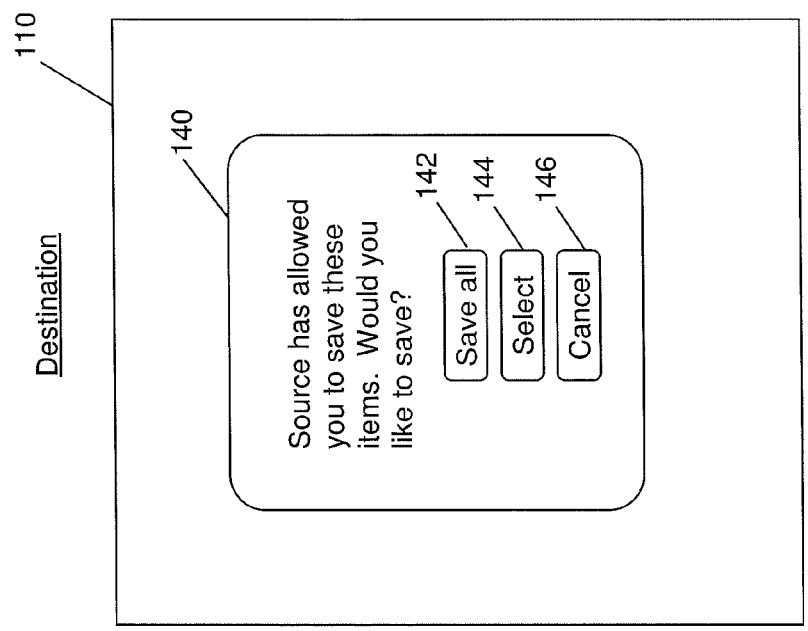
FIG. 20 is a screen shot illustrating a prompt displayed by a destination device after a file sharing session ends.
Figure 19:
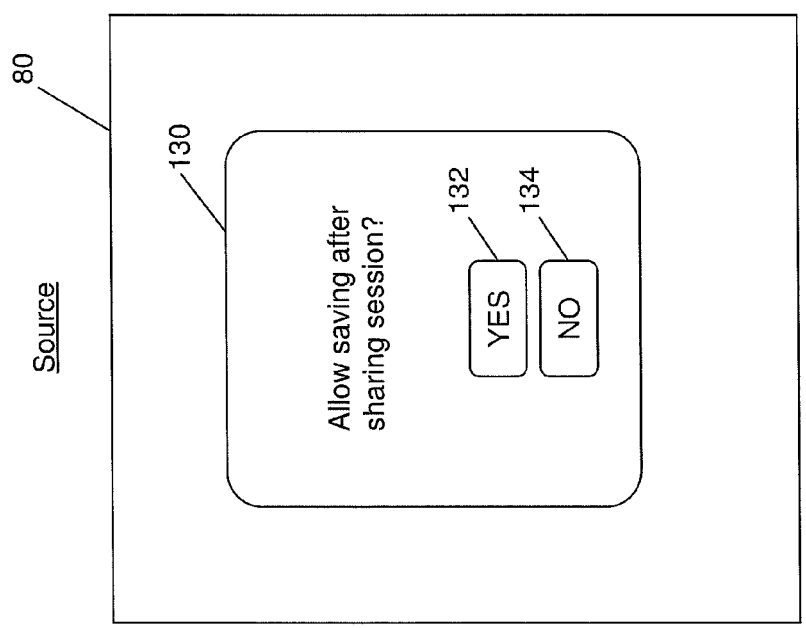
FIG. 19 is a screen shot illustrating a prompt displayed by a source device after a file sharing session ends.

FIG. 19 illustrates the user interface 80 of the source device 18 displaying a source file saving prompt 130. The post session prompt 130 enables the user of the source device 18 to allow or deny saving after the file sharing session by providing yes and no buttons 132, 134 respectively. It can be appreciated that the post session prompt 130 may be displayed before, during, or after the file sharing session. FIG. 20 illustrates the user interface 110 of the destination device 20 displaying a destination file saving prompt 140. The file saving prompt 140 notifies the user of the destination device 20 that the source of the data files has allowed them to save the shared items and provides a save all button 142 for saving all transferred data files 32, a select button 144 to enable the user to select particular ones of the transferred data files 32, and a cancel button 146 to decline saving any of the data files 32.

Figure 21:
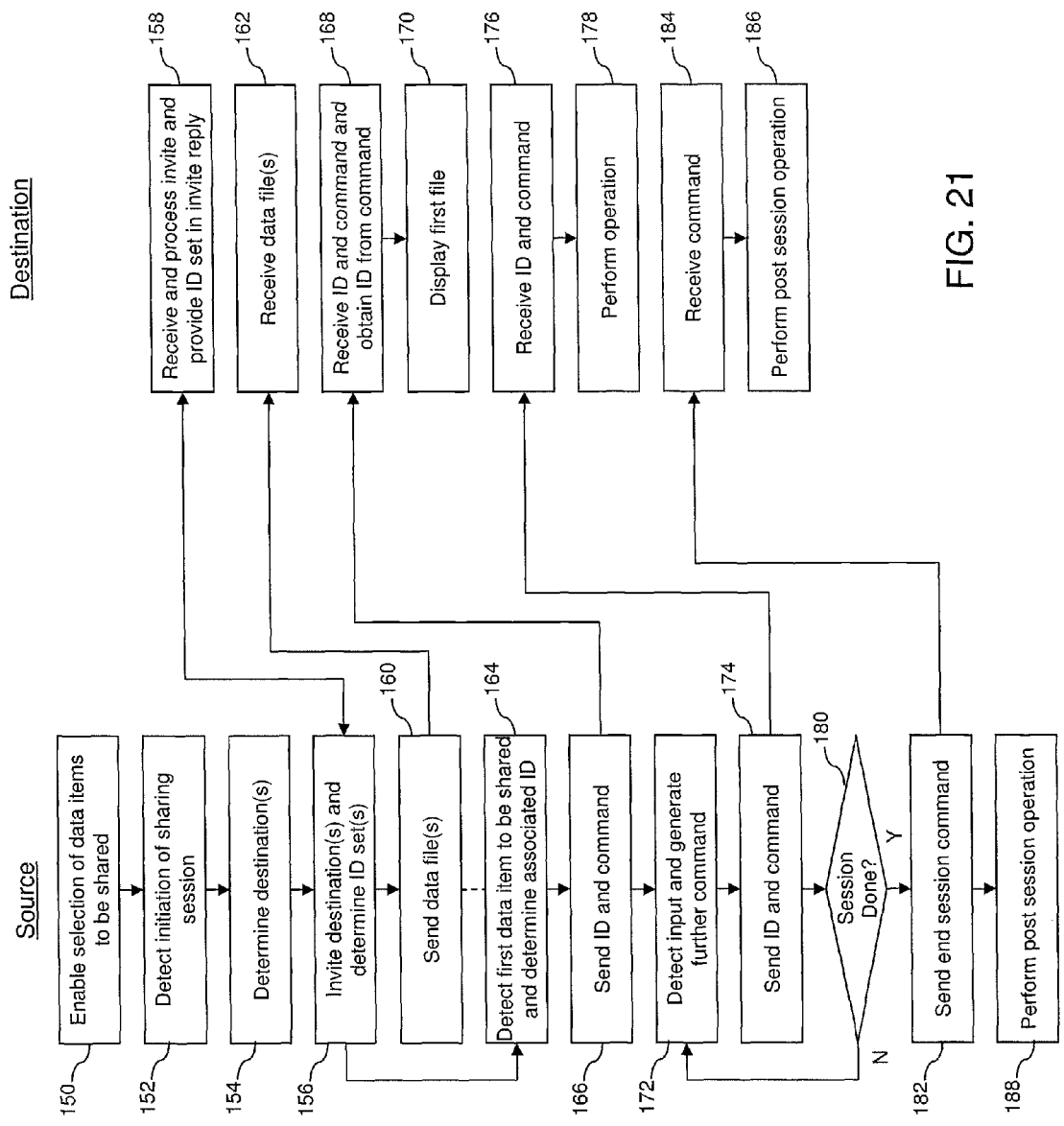
FIG. 21 is a flow chart illustrating an example of a set of computer executable operations that may be performed in conducting a file sharing session.

FIG. 21 illustrates operations that may be performed by a source device 18 and a destination device 20 participating in a file sharing session. At 150, the source device 18 enables selection of data items 82 to be shared and detects initiation of the sharing session, at 152, e.g., selection of the share files option 88 (see FIG. 8). The source device 18 determines one or more destination devices 20 to participate in the file sharing session, at 154. Contact information for the prospective destination devices 20 can be obtained from information stored on the source device 18, information entered by the user of the source device 18, information provided by the destination device 20 (e.g., 2D barcode displayed by the destination device 20, information provided by the destination device 20 in response to scanning a 2D barcode displayed by the source device 18, etc.), or other information available to the source device 18. The source device 18 invites the destination device(s) 20 to determine ID Sets to be sent thereto, at 156, by sending an invite 28, which is received and processed by the destination device 20, at 158. The destination device 20 determines the appropriate ID Subset and returns an invite reply 30 to enable the source device to send the appropriate data files 32, at 160.

The destination device 20 receives the data files 32, at 162, and, as noted above, this process may occur in stages such that at least a first data file 32 is transferred before the file sharing session begins and additional data files 32 continue to be transferred in parallel. At 164, the source device 18 detects a first data item 82 to be shared, e.g., by detecting an input from the user of the source device 18, and determines the ID associated with the first data file 32 and sends a command 34 identifying the first data item 82 using the ID, at 166, to the destination device 20. The destination device 20 receives the command 34, at 168, obtains the ID from the command 34, and displays the first data file 32, at 170, according to the ID.

Either to manipulate the first data file 32 or to have a second data file 32 displayed, the source device 18 detects an input, at 172, and generates a further command 34. If the command 34 manipulates or interacts with the first data file 32, the ID included in the command 34 refers to the already displayed data item 82 on the destination device 20. If the command 34 relates to the display of another data item 82, an associated ID for the other data item 82 is determined and an appropriate command 34 sent to the destination device 20, at 174. The destination device 20 receives the command 34, at 176, and performs the associated operation, at 178, e.g., by performing the same manipulation of the first data file 32 as the source device 18 or displaying a different data item 32.

The source device 18 determines, at 180, whether or not the file sharing session is done. If not, the source device 18 enables further inputs to be received and commands 34 to be generated and sent to the destination device 20, at 172 and 174. If the session is done, the source device 18 may send an end session command, at 182, which is received by the destination device 20, at 184. In this example, the destination device 20 then performs a post session operation, at 186, such as enabling the user to save one or more of the transferred data files 32. The source device 18 also performs post session operations, at 188, such as prompting the user of the source device 18 to allow or deny file saving by the destination devices. It can be appreciated that the post session operations, at 186 and 188 may include the provision of further commands 34 in order to control which data files 32 (if any) may be saved.

FIG. 22 illustrates operations that may be performed by a source device 18 and a destination device 20 in exchanging invites 28 and invite replies 30 to determine data files 32 to be transferred to the destination device 20 for a file sharing session, shown as operations 156 and 158 in FIG. 21. At 200, the source device 18 determines the data items 82 to be shared and, if not already done, generates an ID for each file being shared, at 202. The source device 18 generates an invite 28, at 204, and sends the invite 28 containing the ID Set, at 206, to the destination device 20, which is received by the destination device 20, at 208. The destination device 20 determines which data files 32 from the ID Set are needed, at 210, and generates and sends an invite reply 30, at 212, which includes the ID Subset or an indication that all or none of the data files 32 from the ID Set are needed. The source device 18 receives the invite reply 30, at 214, and generates a data transfer instruction, at 216, based on the invite reply 30. For example, the data sharing application 50 may determine from the invite reply 30 that 2 of 5 data files in the ID Set are required and would then generate a data transfer instruction for the source device 20 to transfer only the 2 specified data files 32.

FIG. 23 illustrates operations that may be performed in generating an ID for a data file 32 to be referenced prior to and during a file sharing session. At 220, information associated with the data file 32 is obtained in order to bind the ID to the data file 32 and to increase the uniqueness of the ID. For example, to increase the likelihood that the ID is unique, the ID may be generated using a combination of various pieces of information such as a date/time stamp for the data file, a unique ID associated with the source device 18 (e.g., PIN, MAC, etc.), pixel values or other content in the data file 32, etc. The ID is generated, at 222, using the information associated with the data file 32 and the ID is associated with the data file 32, at 224, such that referencing the ID will refer specifically to the data file 32. This ID enables data files 32 to be distinguished from each other when performing operations according to the commands 34.

Figure 24:
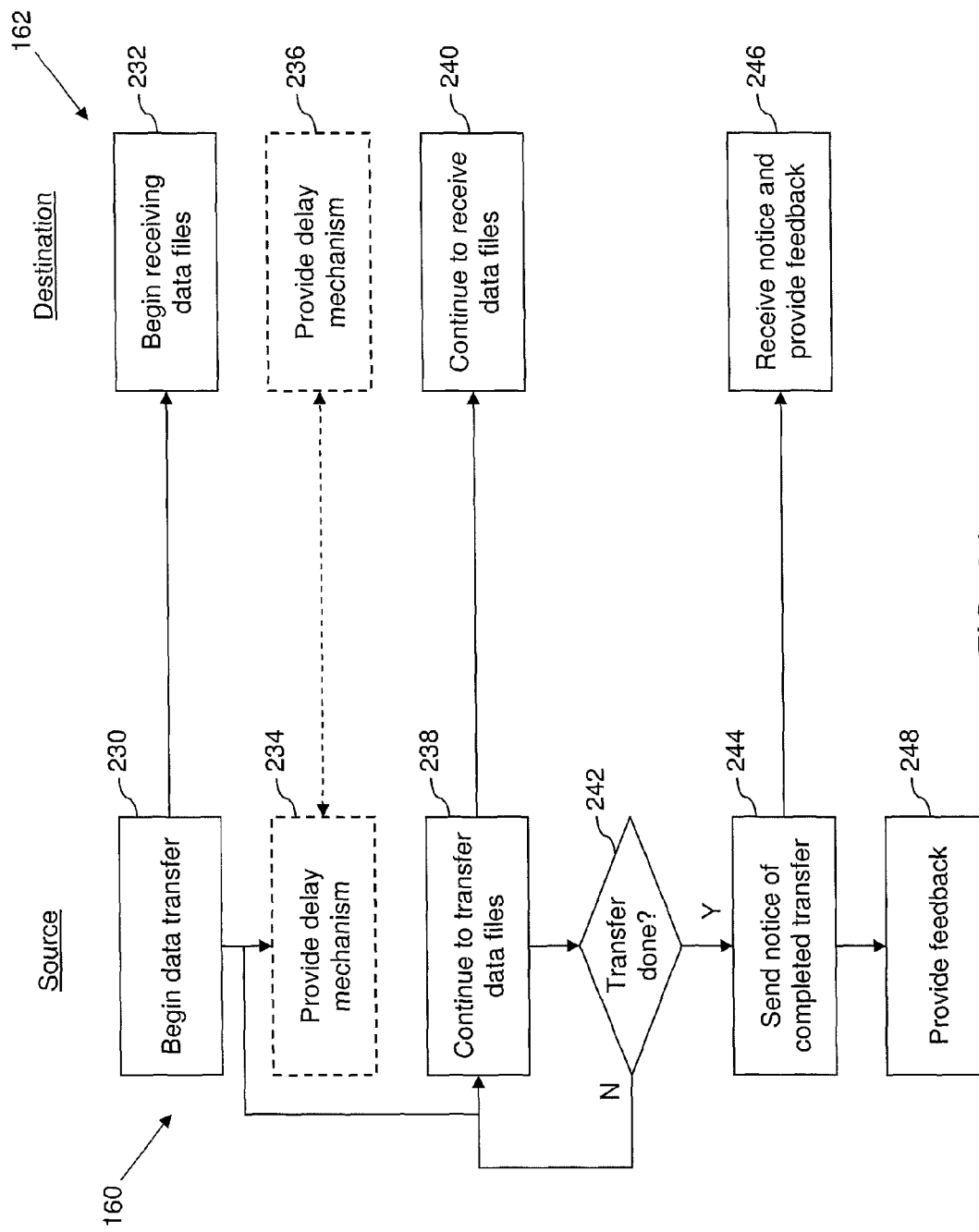
FIG. 24 is a flow chart illustrating an example of a set of computer executable operations that may be performed in transferring data files to be shared in a file sharing session.

FIG. 24 illustrates operations that may be performed by a source device 18 and a destination device 20 in sending and receiving data files 32, identified by operations 160 and 162 in FIG. 21. At 230, the source device 18 begins the data transfer and the destination device 20 begins to receive data files 32, at 232. At 234 and 236, the source device 18 and destination device 20 may participate in a delay mechanism such as entering information, conducting a chat session, establishing a phone conference, etc., to distract the respective users while at least one data file transfer is completed. The source device 18 may continue to transfer data files, at 238, and the destination device 20 may continue to receive data files, at 240, as the data transfer continues. The source device 18 determines, at 242, whether or not the file transfer is done. If not, the source device continues to transfer data files 32 at 238. When the data transfer is done, the source device 18 sends a notice of completed transfer (e.g., a command 34) at 244, which is received by the destination device 20, at 246. The destination device 20 may provide feedback to the user indicative of completion of the transfer, particularly if the delay mechanism is being employed or the user is otherwise waiting to begin the file sharing session. The feedback may include visual, audible or tactile feedback, or any combination of feedback types. The source device 18 may also provide feedback, at 248, to notify the user that the file sharing session may begin.

Figure 25:
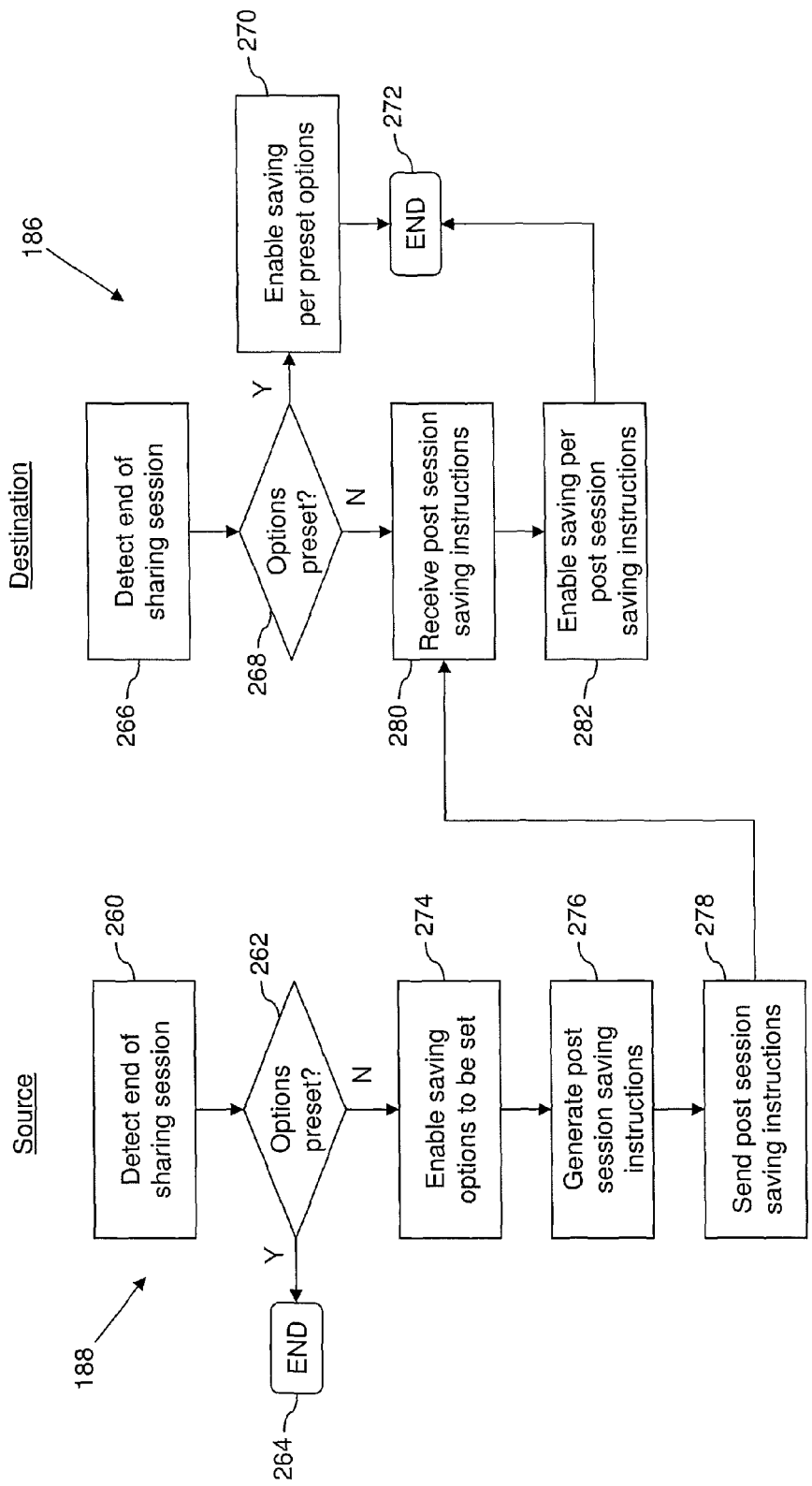
FIG. 25 is a flow chart illustrating an example of a set of computer executable operations that may be performed in performing post file sharing session file management operations.

FIG. 25 illustrates operations that may be performed by a source device 18 and a destination device 20 in performing post session operations, identified by operations 186 and 188 in FIG. 21. At 260, the source device 18 detects the end of the sharing session and determines, at 262, whether or not there exist any options, preferences or pre-established rules for handling data files 32 post session. If so, the source device 18 would not need to perform any post session operations since the destination device 20 would already be instructed how to proceed and the process ends, at 264. The destination device 20 also detects the end of the sharing session, at 266, and determines, at 268, whether or not there exist any options, preferences or pre-established rules for handling data files 32 post session. If so, the data files 32 shared during the file sharing session are saved according to the preset options, at 270, and the process ends, at 272. If pre-established options for post session operations do not exist, in this example, the source device 20 enables saving options to be set by the user of the source device 18, at 274, e.g., by prompting the user. The source device 18 then generates post session saving instructions, at 276 (e.g., using a command 34), and sends the post session saving instructions to the destination device 20, at 278, which are received by the destination device 20, at 280. The destination device 20 enables data files 32 to be saved according to the post session saving instructions, at 282, and the process ends, at 272.

Accordingly, there is provided a method performed by a source device comprising: initiating a transfer of at least one data file to a destination device after detecting initiation of a file sharing session, the at least one data file being associated with the source device; transferring at least a portion of the at least one data file; executing a first interaction with the at least one data file at the source device; and sending a first command to the destination device, the first command indicating a first interaction.

There is also provided a computer readable storage medium comprising computer executable instructions to be performed by a source device, the computer executable instructions comprising instructions for: initiating a transfer of at least one data file to a destination device after detecting initiation of a file sharing session, the at least one data file being associated with the source device; transferring at least a portion of the at least one data file; executing a first interaction with the at least one data file at the source device; and sending a first command to the destination device, the first command indicating a first interaction.

There is also provided a source device comprising a processor and memory, the memory comprising computer executable instructions for causing the processor to: initiate a transfer of at least one data file to a destination device after detecting initiation of a file sharing session, the at least one data file being associated with the source device; transfer at least a portion of the at least one data file; executing a first interaction with the at least one data file at the source device; and send a first command to the destination device, the first command indicating a first interaction.

There is also provided a method performed by a destination device comprising: detecting at the destination device, initiation of a transfer of at least one data file associated with a source device; receiving at least a portion of the at least one data file; after at least the portion of the at least one data file has been received, receiving a first command from the source device, the first command indicating a first interaction with the at least one data file; and executing the first interaction.

There is also provided a computer readable storage medium comprising computer executable instructions to be performed by a destination device, the computer executable instructions comprising instructions for: detecting at the destination device, initiation of a transfer of at least one data file associated with a source device; receiving at least a portion of the at least one data file; after at least the portion of the at least one data file has been received, receiving a first command from the source device, the first command indicating a first interaction with the at least one data file; and executing the first interaction.

There is also provided a destination device comprising a processor and memory, the memory comprising computer executable instructions for causing the processor to: detect at the destination device, initiation of a transfer of at least one data file associated with a source device; receive at least a portion of the at least one data file; after at least the portion of the at least one data file has been received, receive a first command from the source device, the first command indicating a first interaction with the at least one data file; and execute the first interaction.

Figure 26:
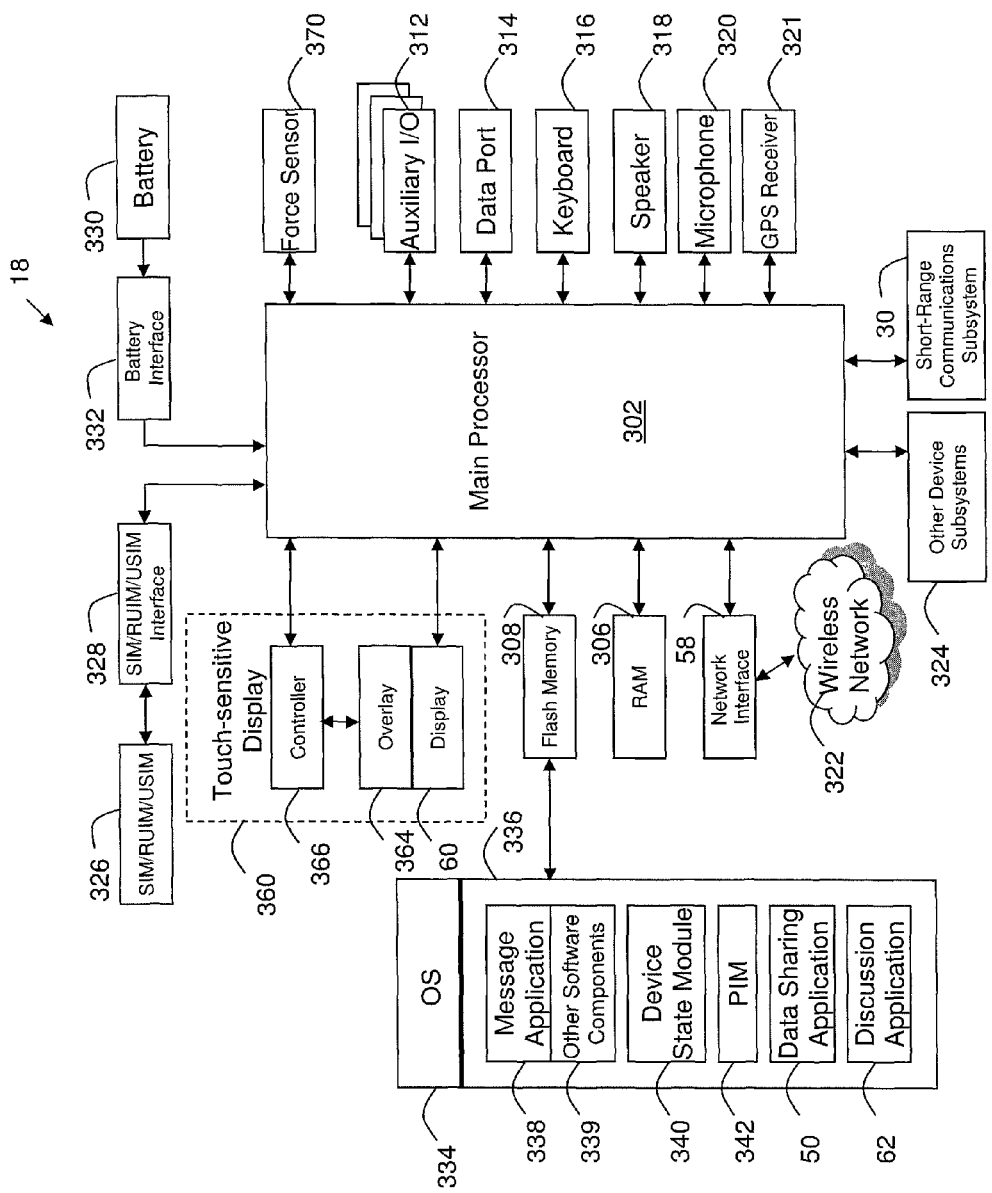
FIG. 26 is a block diagram of an example of a configuration for a source or destination device.

Referring to FIG. 26, to further aid in the understanding of the example devices 18, described above, shown therein is a block diagram of an example configuration an electronic device which may be used as either the source device 18, the destination device 20, or both. For ease of discussion, the example electronic device of FIG. 26 will be referenced as source device 18. The source device 18 includes a number of components such as a main processor 302 that controls the overall operation of the source device 18. Communication functions, including data and voice communications, are performed through a network interface 58. The network interface 58 receives messages from and sends messages to a wireless network 322. In this example of the source device 18, the network interface 58 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the network interface 58 with the wireless network 322 represents one or more different Radio Frequency (RF) channels, operating according to defined protocols specified for GSM/GPRS communications.

The main processor 302 also interacts with additional subsystems such as a Random Access Memory (RAM) 306, a flash memory 308, a touch-sensitive display 360, an auxiliary input/output (I/O) subsystem 312, a data port 314, a keyboard 316 (physical, virtual, or both), a speaker 318, a microphone 320, a GPS receiver 321, short-range communications subsystem 30, and other device subsystems 324. Some of the subsystems of the source device 18 perform communication-related functions, whereas other subsystems may provide "resident" or on-device functions. By way of example, a display 60 and the keyboard 316 may be used for both communication-related functions, such as entering a text message for transmission over the wireless network 322, and device-resident functions such as a calculator or task list. In one example, the source device 18 can include a non touch-sensitive display in place of, or in addition to the touch-sensitive display 360. For example the touch-sensitive display 360 can be replaced by a display 60 that may not have touch-sensitive capabilities.

The source device 18 can send and receive communication signals over the wireless network 322 after required network registration or activation procedures have been completed. Network access is associated with a subscriber or user of the source device 18. To identify a subscriber, the source device 18 may use a subscriber module component or "smart card" 326, such as a Subscriber Identity Module (SIM), a Removable User Identity Module (RUIM) and a Universal Subscriber Identity Module (USIM). In the example shown, a SIM/RUIM/USIM 326 is to be inserted into a SIM/RUIM/USIM interface 328 in order to communicate with a network.

The source device 18 is typically a battery-powered device and includes a battery interface 332 for receiving one or more rechargeable batteries 330. In at least some examples, the battery 330 can be a smart battery with an embedded microprocessor. The battery interface 332 is coupled to a regulator (not shown), which assists the battery 330 in providing power to the source device 18. Although current technology makes use of a battery, future technologies such as micro fuel cells may provide the power to the source device 18.

The source device 18 also includes an operating system 334 and software components 336 to 342, 50, and 62. The operating system 334 and the software components 336 to 342, 50, and 62, that are executed by the main processor 302 are typically stored in a persistent store such as the flash memory 308, which may alternatively be a read-only memory (ROM) or similar storage element (not shown). Those skilled in the art will appreciate that portions of the operating system 334 and the software components 336 to 342, 50, and 62, such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the source device 18 during its manufacture. Software applications may include a message application 338, a device state module 340, a Personal Information Manager (PIM) 342, a data sharing application 50, and a discussion application 62. A message application 338 can be any suitable software program that allows a user of the source device 18 to send and receive electronic messages, wherein messages are typically stored in the flash memory 308 of the source device 18. A device state module 340 provides persistence, i.e. the device state module 340 ensures that important device data is stored in persistent memory, such as the flash memory 308, so that the data is not lost when the source device 18 is turned off or loses power. A PIM 342 includes functionality for organizing and managing data items of interest to the user, such as, but not limited to, e-mail, contacts, calendar events, and voice mails, and may interact with the wireless network 322.

Other types of software applications or components 339 can also be installed on the source device 18. These software applications 339 can be pre-installed applications (i.e. other than message application 338) or third party applications, which are added after the manufacture of the source device 18. Examples of third party applications include games, calculators, utilities, etc.

The additional applications 339 can be loaded onto the source device 18 through at least one of the wireless network 322, the auxiliary I/O subsystem 312, the data port 314, the short-range communications subsystem 30, or any other suitable device subsystem 324.

The data port 314 can be any suitable port that enables data communication between the source device 18 and another computing device. The data port 314 can be a serial or a parallel port. In some instances, the data port 314 can be a USB port that includes data lines for data transfer and a supply line that can provide a charging current to charge the battery 330 of the source device 18.

For voice communications, received signals are output to the speaker 318, and signals for transmission are generated by the microphone 320. Although voice or audio signal output is accomplished primarily through the speaker 318, the display 60 can also be used to provide additional information such as the identity of a calling party, duration of a voice call, or other voice call related information.

The touch-sensitive display 360 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 360 is a capacitive touch-sensitive display which includes a capacitive touch-sensitive overlay 364. The overlay 364 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 60 of the touch-sensitive display 360 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 360. The processor 302 may determine attributes of the touch, including a location of a touch. Touch location data may include an area of contact or a single point of contact, such as a point at or near a center of the area of contact, known as the centroid. A signal is provided to the controller 366 in response to detection of a touch. A touch may be detected from any suitable object, such as a finger, thumb, appendage, or other items, for example, a stylus, pen, or other pointer, depending on the nature of the touch-sensitive display 360. The location of the touch moves as the detected object moves during a touch. One or both of the controller 366 and the processor 302 may detect a touch by any suitable contact member on the touch-sensitive display 360. Similarly, multiple simultaneous touches, are detected.

One or more gestures are also detected by the touch-sensitive display 360. A gesture is a particular type of touch on a touch-sensitive display 360 that begins at an origin point and continues to an end point. A gesture may be identified by attributes of the gesture, including the origin point, the end point, the distance traveled, the duration, the velocity, and the direction, for example. A gesture may be long or short in distance and long or short in duration. Two points of the gesture may be utilized to determine a direction of the gesture.

An example of a gesture is a swipe (also known as a "flick"). A swipe has a single direction. The touch-sensitive overlay 364 may evaluate swipes with respect to the origin point at which contact is initially made with the touch-sensitive overlay 364 and the end point at which contact with the touch-sensitive overlay 364 ends rather than using each of location or point of contact over the duration of the gesture to resolve a direction.

Examples of swipes include a horizontal swipe, a vertical swipe, and a diagonal swipe. A horizontal swipe typically comprises an origin point towards the left or right side of the touch-sensitive overlay 364 to initialize the gesture, a horizontal movement of the detected object from the origin point to an end point towards the right or left side of the touch-sensitive overlay 364 while maintaining continuous contact with the touch-sensitive overlay 364, and a breaking of contact with the touch-sensitive overlay 364. Similarly, a vertical swipe typically comprises an origin point towards the top or bottom of the touch-sensitive overlay 364 to initialize the gesture, a horizontal movement of the detected object from the origin point to an end point towards the bottom or top of the touch-sensitive overlay 364 while maintaining continuous contact with the touch-sensitive overlay 364, and a breaking of contact with the touch-sensitive overlay 364.

Swipes can be of various lengths, can be initiated in various places on the touch-sensitive overlay 364, and need not span the full dimension of the touch-sensitive overlay 364. In addition, breaking contact of a swipe can be gradual in that contact with the touch-sensitive overlay 364 is gradually reduced while the swipe is still underway.

Meta-navigation gestures may also be detected by the touch-sensitive overlay 364. A meta-navigation gesture is a gesture that has an origin point that is outside the display area of the touch-sensitive overlay 364 and that moves to a position on the display area of the touch-sensitive display. Other attributes of the gesture may be detected and be utilized to detect the meta-navigation gesture. Meta-navigation gestures may also include multi-touch gestures in which gestures are simultaneous or overlap in time and at least one of the touches has an origin point that is outside the display area and moves to a position on the display area of the touch-sensitive overlay 364. Thus, two fingers may be utilized for meta-navigation gestures. Further, multi-touch meta-navigation gestures may be distinguished from single touch meta-navigation gestures and may provide additional or further functionality.

In some examples, an optional force sensor 370 or force sensors is disposed in any suitable location, for example, between the touch-sensitive display 360 and a back of the source device 18 to detect a force imparted by a touch on the touch-sensitive display 360. The force sensor 370 may be a force-sensitive resistor, strain gauge, piezoelectric or piezoresistive device, pressure sensor, or other suitable device. Force as utilized throughout the specification refers to one or more of force measurements, estimates, and calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

It will be appreciated that any module or component exemplified herein that executes instructions may include or otherwise have access to computer readable media such as storage media, computer storage media, or data storage devices (removable or non-removable or both removable and non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the source device 18, destination device 20 or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method performed by a source device comprising:
    initiating a transfer of at least one data file from the source device to a destination device after detecting initiation of a file sharing session, the at least one data file residing on the source device, wherein the source device contributes the at least one data file to the file sharing session, and wherein the file sharing session presents interactions performed on the at least one data file by one of the source device and the destination device to the other of the source device and the destination device;
    beginning transferring the at least one data file from the source device to the destination device;
    providing a delay mechanism on at least the source device as a distraction until at least some of the at least one data file has been transferred, the delay mechanism prompting a user of the source device to enter information as part of the file sharing session, wherein the delay mechanism comprises:
        enabling a discussion channel to be established between the source device and the destination device;
        displaying a first prompt with an option to initiate the discussion channel; and
        displaying a second prompt for entering information;
    continuing transferring the at least one data file to the destination device;
    detecting a first input by the user directly on the source device, the first input corresponding to a first interaction by the user with the at least one data file at the source device after the at least some of the at least one data file has been transferred; and
    sending, in response to detecting the first input, a first command from the source device to the destination device, the first command indicating the first interaction and synchronizing the first interaction performed on the at least one data file on the source device with a corresponding first interaction to be performed on the at least one data file transferred to the destination device.

2. The method of claim 1, the first command including an identifier associated with a corresponding data file, the identifier being used to identify the corresponding data file for executing the first interaction.

3. The method of claim 1, further comprising:
    receiving a second command from the destination device, the second command indicating a second interaction with the at least one data file; and
    executing the second interaction.

4. The method of claim 1, further comprising:
    detecting an end to the file sharing session; and
    performing at least one post session operation related to the at least one data file transferred to the destination device.

5. The method of claim 4, the at least one post session operation comprising enabling the source device to control which of the at least one data file can be saved by the destination device after the file sharing session ends.

6. The method of claim 1, further comprising:
    sending an invite to the destination device, the invite including a set of identifiers corresponding to a set of data files to be transferred;
    receiving an invite reply indicating a subset of the identifiers which are absent from the destination device; and
    initiating the transfer of a subset of data files according to the invite reply.

7. The method of claim 1, comprising transferring the at least one data file to a plurality of destination devices.

8. The method of claim 1, the discussion channel providing any one or more of a chat session, and a telephone call.

9. The method of claim 1, further comprising:
    executing a second interaction with the at least one data file; and
    sending a second command to the source device, the second command indicating the second interaction.

10. A method performed by a destination device comprising:
    detecting at the destination device, initiation of a file sharing session by a source device, the file sharing session transferring at least one data file from source device and presenting interactions performed on the at least one data file by one of the source device and the destination device to the other of the source device and the destination device, wherein the source device contributes the at least one data file to the file sharing session;
    beginning receiving the at least one data file from the source device;
    providing a delay mechanism on the destination device as a distraction until at least some of the at least one data file has been received, the delay mechanism prompting a user of the destination device to enter information as part of the file sharing session, wherein the delay mechanism comprises:
        enabling a discussion channel to be established between the source device and the destination device;
        displaying a first prompt with an option to initiate the discussion channel; and
        displaying a second prompt for entering information;
    continuing receiving the at least one data file from the source device;
    after the at least some of the at least one data file has been received, receiving a first command from the source device, the first command indicating a first interaction with the at least one data file and synchronizing the first interaction performed on the at least one data file on the source device with a corresponding first interaction operation to be performed on the at least one data file received by the destination device; and executing the corresponding first interaction based on the first command.

11. The method of claim 10, the first command including an identifier associated with a corresponding data file, the identifier being used to identify the corresponding data file for executing the first interaction.

12. The method of claim 10, further comprising detecting an end to the file sharing session and performing at least one post session operation related to the at least one data file transferred to the destination device.

13. The method of claim 12, the at least one post session operation comprising enabling the destination device to save the at least one data file after the file sharing session ends.

14. The method of claim 10, further comprising:
receiving an invite from the source device, the invite including a set of identifiers corresponding to a set of data files to be transferred; and
sending an invite reply indicating a subset of the identifiers absent from the destination device.

15. The method of claim 10, wherein the delay mechanism:
enabling participation in a discussion channel established between the source device and the destination device;
displaying a first prompt with an option to participate in the discussion channel; and
displaying a second prompt for entering information.

16. The method of claim 15, the discussion channel providing any one or more of a chat session, and a telephone call.

17. A non-transitory computer readable storage medium comprising computer executable instructions to be performed by a source device, the computer executable instructions comprising instructions for:
initiating a transfer of at least one data file from the source device to a destination device after detecting initiation of a file sharing session, the at least one data file residing on the source device, wherein the source device contributes the at least one data file to the file sharing session, and wherein the file sharing session presents interactions performed on the at least one data file by one of the source device and the destination device to the other of the source device and the destination device;
beginning transferring the at least one data file from the source device to the destination device;
providing a delay mechanism on at least the source device as a distraction until at least some of the at least one data file has been transferred, the delay mechanism prompting a user of the source device to enter information as part of the file sharing session, wherein the delay mechanism comprises:
enabling a discussion channel to be established between the source device and the destination device;
displaying a first prompt with an option to initiate the discussion channel; and
displaying a second prompt for entering information;
continuing transferring the at least one data file to the destination device;
detecting a first input by the user directly on the source device, the first input corresponding to first interaction by the user with the at least one data file at the source device after the at least some of the at least one data file has been transferred; and sending, in response to detecting the first input, a first command from the source device to the destination device, the first command indicating the first interaction and synchronizing the first interaction performed on the at least one data file on the source device with a corresponding first interaction to be performed on the at least one data file transferred to the destination device.

18. A source device comprising a processor and memory, the memory comprising computer executable instructions for causing the processor to:
sending an invite to a destination device, the invite including a set of identifiers corresponding to a set of data files to be transferred during a file sharing session;
receiving, from the destination device, an invite reply indicating a subset of the set of identifiers that are absent from the destination device;
initiating a transfer of a subset of the set of data files corresponding the subset of the set of identifiers received in the invite reply from source device to the destination device after detecting initiation of the file sharing session, the subset of the set of data files residing on and being contributed by the source device to the file sharing session;
begin transferring the at least one data file from the source device the destination device;
provide a delay mechanism on at least the source device as a distraction until at least some of the subset of the set of data files has been transferred, wherein the delay mechanism comprises:
enabling a discussion channel to be established between the source device and the destination device;
displaying a first prompt with an option to initiate the discussion channel; and
displaying a second prompt for entering information;
continue transferring the subset of the set of data files to the destination device;
execute a first interaction with at least one of the subset of the set of data files at the source device after the at least some of the at least one of the subset of the set of data files has been transferred; and
send a first command from the source device to the destination device, the first command indicating the first interaction.

19. A non-transitory computer readable storage medium comprising computer executable instructions to be performed by a destination device, the computer executable instructions comprising instructions for:
detecting at the destination device, initiation of a file sharing session by a source device, the file sharing session transferring at least one data file from source device and presenting interactions performed on the at least one data file by one of the source device and the destination device to the other of the source device and the destination device, wherein the source device contributes the at least one data file to the file sharing session;
beginning receiving the at least one data file from the source device;
providing a delay mechanism on the destination device as a distraction until at least some of the at least one data file has been received, the delay mechanism prompting a user of the destination device to enter information as part of the file sharing session, wherein the delay mechanism comprises:

enabling a discussion channel to be established between the source device and the destination device;

displaying a first prompt with an option to initiate the discussion channel; and displaying a second prompt for entering information;

continuing receiving the at least one data file from the source device;

after the at least some of the at least one data file has been received, receiving a first command from the source device, the first command indicating a first interaction with the at least one data file and synchronizing the first interaction performed on the at least one data file on the source device with a corresponding first interaction operation to be performed on the at least one data file received by the destination device; and executing the corresponding first interaction based on the first command.

20. A destination device comprising a processor and memory, the memory comprising computer executable instructions for causing the processor to:

receiving an invite from a source device, the invite including a set of identifiers corresponding to a set of data files to be transferred during a file sharing session;

sending to the source device an invite reply indicating a subset of the set of identifiers that are absent from the destination device;

detecting at the destination device, initiation of the file sharing session by the source device, the file sharing session transferring from the source device a subset of the set of data files corresponding the subset of the set of identifiers, wherein the source device contributes the subset of set of data files to the file sharing session;

begin receiving the subset of the set of data files from the source device;

provide a delay mechanism on the destination device as a distraction until at least some of the subset of the set of data files has been received, wherein the delay mechanism comprises:

enabling a discussion channel to be established between the source device and the destination device;

displaying a first prompt with an option to initiate the discussion channel; and displaying a second prompt for entering information;

continue receiving the subset of the set of data files from the source device;

after the at least some of the subset of the set of data files has been received, receive a first command from the source device, the first command indicating a first interaction with the at least one of the subset of the set of data files; and execute the first interaction.

* * * * *